(12) United States Patent
Hirokane et al.

(10) Patent No.: US 7,859,983 B2
(45) Date of Patent: Dec. 28, 2010

(54) OPTICAL DISK AND OPTICAL DISK RECORDING AND REPRODUCING DEVICE

(75) Inventors: Junji Hirokane, Nara (JP); Michinobu Mieda, Shiki-gun (JP); Masanori Shimo, Gose (JP)

(73) Assignee: Sharp Kabushiki Kaisha, Osaka (JP)

( * ) Notice: Subject to any disclaimer, the term of this patent is extended or adjusted under 35 U.S.C. 154(b) by 767 days.

(21) Appl. No.: 10/890,916

(22) Filed: Jul. 13, 2004

(65) Prior Publication Data

US 2005/0013236 A1 Jan. 20, 2005

(30) Foreign Application Priority Data

Jul. 15, 2003 (JP) ............................. 2003-197392
Nov. 18, 2003 (JP) ............................. 2003-388193

(51) Int. Cl.
*G11B 7/00* (2006.01)

(52) U.S. Cl. ...................... 369/286; 369/94; 369/272.1; 369/275.5; 369/280

(58) Field of Classification Search .............. 369/272.1, 369/275.5, 280, 283
See application file for complete search history.

(56) References Cited

U.S. PATENT DOCUMENTS

| | | | | |
|---|---|---|---|---|
| 4,450,553 | A * | 5/1984 | Holster et al. ............. | 369/275.5 |
| 6,168,843 | B1 * | 1/2001 | Kambe et al. .............. | 428/64.1 |
| 6,287,660 | B1 * | 9/2001 | Hosaka et al. ............. | 428/64.1 |
| 6,507,559 | B1 * | 1/2003 | Iwaki ...................... | 369/275.5 |
| 6,721,257 | B2 * | 4/2004 | Alperovich et al. ......... | 369/108 |
| 6,743,320 | B2 * | 6/2004 | Hisada et al. ............... | 156/233 |
| 2001/0044000 | A1 * | 11/2001 | Miki ....................... | 428/64.2 |
| 2002/0036979 | A1 | 3/2002 | Hayashida et al. | |
| 2002/0041564 | A1 * | 4/2002 | Yoshinari et al. ......... | 369/275.3 |
| 2002/0048256 | A1 * | 4/2002 | Yamasaki et al. ........... | 369/283 |
| 2002/0060959 | A1 * | 5/2002 | Shiono et al. ............ | 369/44.24 |
| 2003/0068513 | A1 | 4/2003 | Kubota et al. | |
| 2003/0134229 | A1 * | 7/2003 | Yasuda et al. .......... | 430/270.13 |
| 2004/0130998 | A1 * | 7/2004 | Iwasa et al. .................. | 369/94 |
| 2004/0179463 | A1 | 9/2004 | Yamasaki et al. | |
| 2004/0258871 | A1 | 12/2004 | Mizushima et al. | |
| 2005/0259552 | A1 * | 11/2005 | Miura et al. .................. | 369/94 |

FOREIGN PATENT DOCUMENTS

| | | |
|---|---|---|
| JP | 61-050230 | 3/1986 |
| JP | 63-013147 | 1/1988 |

(Continued)

*Primary Examiner*—Lixi Chow
(74) *Attorney, Agent, or Firm*—Edwards Angell Palmer & Dodge LLP; David G. Conlin; William J. Daley, Jr.

(57) ABSTRACT

An optical disk includes a plurality of disk sheets which are laminated, and each of which has a recording face on one of the surfaces and a flat back surface, wherein the plurality of disk sheets are laminated by adhesive layers in such a manner that between adjacent two disk sheets, a back surface of one of the disk sheets, on the opposite side of the surface where the recording face is formed, faces the disk surface of the other disk sheet. The foregoing structure realizes an optical disk of desirable recording/reproducing characteristics, which is flat and has a fixed interval between recording faces, and which permits the problems of coma aberration, spherical aberration, etc., to be suppressed.

3 Claims, 16 Drawing Sheets

FOREIGN PATENT DOCUMENTS

| | | |
|---|---|---|
| JP | 3-219443 | 9/1991 |
| JP | 4-78033 A | 3/1992 |
| JP | 10-40575 A | 2/1998 |
| JP | 10-222870 A | 8/1998 |
| JP | 11-185303 A | 7/1999 |
| JP | 2001-134981 | 5/2001 |
| JP | 2001-266412 A | 9/2001 |
| JP | 2002-251801 | 9/2002 |
| JP | 2002-260276 A | 9/2002 |
| JP | 2003-91868 A | 3/2003 |
| JP | 2003-123332 A | 4/2003 |
| JP | 2003-151173 A | 5/2003 |
| JP | 2003-203402 A | 7/2003 |
| JP | 2003-242680 A | 8/2003 |
| JP | 2003-272237 A | 9/2003 |
| JP | 2003-272260 A | 9/2003 |

* cited by examiner

OPTICAL DISK AND OPTICAL DISK RECORDING AND REPRODUCING DEVICE

This Non-provisional application claims priority under 35 U.S.C. §119(a) on patent application Ser. No. 2003/197392 filed in Japan on Jul. 15, 2003, and patent application Ser. No. 2003/388193 filed in Japan on Nov. 18, 2003 the entire contents of which are hereby incorporated by reference.

FIELD OF THE INVENTION

The present invention relates to an optical disk having a plurality of recording faces and an optical disk recording and reproducing device adopting such optical disk.

BACKGROUND OF THE INVENTION

A conventional manufacturing method of an optical disk 200 having a plurality of recording faces will be explained in reference to FIGS. 25(a) to 25(c), and FIGS. 26(a) and 26(c) (see, for example, Japanese Laid-Open patent Japanese Unexamined Patent Publication No. 2001-134981 (Tokukai 2001-134981 published on May 18, 2001).

Firstly, a first substrate 100 having formed thereon recording pits 101 is formed by the injection molding method or the 2P method, and then a first reflective film 102 is formed so as to cover the first pits 101 (see FIG. 25(a)), thereby forming a recording face 201.

Next, on the first substrate 100 having formed thereon the first reflective film 102, an original substrate 104 is placed with a predetermined interval (see FIG. 25(b)). On this original substrate 104, formed are second bits 105 having recorded thereon different information from that of the first pits 101 (see FIG. 25(b)). Thereafter, a recording layer 103 is formed by filling the space between the first substrate 100 and the original substrate 104 with ultraviolet ray curing resin, and hardening the ultraviolet ray curing resin by projecting thereon an ultraviolet ray (FIG. 25 (c)).

Next, after removing the original substrate 104, a second reflective film 106 is formed on the first recording layer 103 having copied thereto the second recording pits 105 are copied, thereby forming a recording face 205.

The first substrate 100 on which the recording face 201 and the recording face 205 are formed, and a second substrate 107 on which a recording face 208 having formed thereon the third pits 108 and the third reflective film 109 is formed are placed with a predetermined interval in between so that the recording face 205 and the recording face 208 face each other (FIG. 26b). The space between the first substrate 100 and the second substrate 107 is filled with ultraviolet ray curing resin 110. Then, the recording layer 110 is hardened by projecting thereon an ultraviolet ray so as to connect the first substrate 100 and the second substrate 107 together (see FIG. 26 (c)).

In the foregoing process, an optical disk 200 including the first recording face 201 having formed thereon the first bits 101, a recording face 205 having formed thereon the second pits 105, and the recording face 208 having formed thereon the third pits 108 can be manufactured.

In the foregoing conventional example, explanations will be given through the case of the method of forming an optical disk with the three-layered recording face. However, by repeating the foregoing copying process, it is possible to form an optical disk having a greater number of recording faces.

However, the optical disk 200 formed by the foregoing manufacturing process has the following problems as will be explained below.

a) The optical disk 200 cannot be maintained flat.

b) An interval between adjacent recording faces cannot be controlled with high precision.

Problem a)

Generally, it is necessary to form the first recording layer 103 and the second recording layer 110 in a thickness of around 10 μm for the purpose of preventing an interlayer cross light or interlayer crosstalk generated when recording or reproducing.

In the foregoing method, when forming the first recording layer 103, the space between the first substrate 100 and the original substrate 104 is filled with liquid ultraviolet ray curing resin, and hardening the resin with an application of an ultraviolet ray. Here, a problem arises in that the recording layer 103 shrinks in the hardening process with an application of the ultraviolet ray.

The foregoing problem of shrinkage arises also in the process of forming the recording layer 110.

For example, in the case where the recording layer 103 and the recording layer 110 are formed in a thickness of 20 μm, the optical disk 200 is tilted to a large extent due to the shrinkage when hardening, and it becomes no longer possible to maintain the disk flat. Furthermore, when forming other recording layer 103 in addition to the recording layers 103 and 110, the optical disk 200 would be tilted to a larger extent.

When adopting the foregoing disk 200 with the foregoing problems of a large tilt which makes it difficult to maintain the disk 200 flat, coma aberration of the light beam would be increased, which makes it difficult to form a desirable light beam spot, thereby deteriorating the recording/reproducing characteristics.

Problem b)

According to the foregoing manufacturing method, in the process of filling the space between the first substrate 100 and the original substrate 104 with liquid ultraviolet ray curing resin, the original substrate 104 and the first substrate 100 are liable to be partially distorted.

The foregoing partial distortion results in uneven interval between the original substrate 104 and the first substrate 100, i.e., the thickness of the first recording layer 103.

Furthermore, in the process of connecting the substrates together as shown in FIG. 26(c), it is necessary to carry out the process of hardening the second recording layer 100 in the state different from that shown in FIG. 25(c). Namely, in the state shown in FIG. 25(c), the ultraviolet ray curing resin filled in the space between the first substrate 100 (generally made of plastics) and the original substrate 104 (generally metal plate or glass plate). In contrast, in the state shown in FIG. 26(c), the ultraviolet ray curing resin filled in the space between the first substrate 100 and the second substrate 107 (generally made of plastic) is hardened.

As described, when carrying out the process of hardening the recording layers under different conditions, such hardening conditions as a rise in temperatures when hardening, etc., are liable to change, and it is difficult to form the first recording layer 103 and the second recording layer 110 in the same thickness.

As described, in the foregoing conventional manufacturing process, the thickness of each recording layer becomes partially uneven, or the thickness between recording layers becomes uneven, which results in such problem that the interval between the adjacent recording faces cannot be controlled with high precision.

When adopting the foregoing optical disk manufactured by the conventional method, in which an interval between the recording faces varies, a spherical aberration occurs in the light beam when recording/reproducing, resulting in the problem of increasing a focused beam spot diameter or deterioration in recording/reproducing characteristics.

SUMMARY OF THE INVENTION

It is an object of the present invention to provide an optical disk which is flat and has a fixed interval between recording faces, and which permits the problems of coma aberration, spherical aberration, etc., to be suppressed, and an optical disk recording/reproducing device adopting the same.

In order to achieve the foregoing object, an optical disk of the present invention is characterized by including:

a plurality of disk sheets which are laminated, and each of which has a recording face on one of the surfaces, wherein:

the plurality of disk sheets are laminated in such a manner that between adjacent two disk sheets, a back surface of one of the disk sheets, on the opposite side of the surface where the recording face is formed, faces the disk surface of the other disk sheet.

According to the foregoing structure of the optical disk, a plurality of disk sheets, each having a recording face, are laminated. With this structure, as compared to the conventional optical disk formed by hardening the ultraviolet ray curing resin on a substrate in sequence, a shrinkage is not liable to occur in the process of forming recording faces, and thus the disk can be maintained flat.

Furthermore, as a disk sheet of a uniform thickness without a partial distortion can be selected as a disk sheet to be laminated, an interval between recording faces of the adjacent disk sheets can be maintained constant.

In the optical disk, when recording or reproducing, the problem of generating coma aberration or spherical aberration of the light beam can be suppressed, thereby realizing desirable recording/reproducing characteristics.

Furthermore, with the structure wherein a plurality of disk sheets are laminated in such a manner that between adjacent two disk sheets, the back surface of one of the disk sheets, on the opposite side of the surface where the recording face is formed, faces the disk surface of the other disk sheet, an interval between adjacent recording faces can be more surely maintained constant.

In order to achieve another object, another optical disk in accordance with the present invention is characterized by including:

a disk substrate;

a disk sheet layer made up of plurality of layers laminated on the disk substrate, each having a recording face, wherein an inner diameter of the disk sheet layer is larger than an inner diameter of the disk substrate.

According to the foregoing structure wherein the inner diameter of the disk sheet layer is larger than the inner diameter of the disk substrate, the disk sheet layer can be prevented from being separated from the disk substrate or from the adjacent disk sheet layer at the central hole of the optical disk, and thus the effect of providing a highly reliable optical disk can be achieved. Namely, in the case where the inner diameter of the disk sheet layer is equal to the inner diameter of the disk substrate, or the inner diameter of the disk sheet layer is smaller than the inner diameter of the disk substrate, when fixing and holding the optical disk, a jig contacts the central hole of the disk sheet layer, which causes a separation of the disk sheet. In contrast, in the case where the inner diameter of the disk sheet layer is larger than the inner diameter of the disk substrate, the jig contacts only the central hole of the disk substrate, and does not contact the central hole of the disk sheet layer, thereby suppressing the problem of the separation of the disk sheet.

Another optical disk of the present invention is characterized by including:

a disk substrate; and a disk sheet layer made up of plurality of layers laminated on the disk substrate, each having a recording face, wherein an outer diameter of the disk sheet layer is smaller than an outer diameter of the disk substrate.

According to the foregoing structure, the outer diameter of the disk sheet layer is smaller than the outer diameter of the disk substrate, the disk sheet layer can be prevented from being separated from the disk substrate or from the adjacent disk sheet layer at an outer circumference of the optical disk, and thus the effect of providing a highly reliable optical disk. Namely, in the case where the outer diameter of the disk sheet layer is equal to the outer diameter of the disk substrate or the outer diameter of the disk sheet layer is larger than the outer diameter of the disk substrate, when fixing and holding the optical disk, the disk sheet layer contacts a jig, which causes a separation of the disk sheet. In contrast, in the case where the outer diameter of the disk sheet layer is smaller than the outer diameter of the disk substrate, the jig contacts only the outer circumference of the disk substrate, and does not contact the outer circumference of the disk sheet layer, thereby suppressing the problem of the separation of the disk sheet.

Another optical disk of the present invention is characterized by including:

a disk substrate; and a disk sheet layer made up of plurality of layers laminated on the disk substrate, each having a recording face, wherein a first region of the disk substrate where said disk substrate is formed is thinner than a second region other than said first region.

With this structure, the second region of the disk substrate may be an inner circumferential region located inside a predetermined radius, an outer circumferential region located outside the predetermined radius, or both the inner circumferential region and the outer circumferential region. The second region of the disk substrate may be an inner circumferential region located inside a predetermined radius, an outer circumferential region located outside the predetermined radius, or both the inner circumferential region and the outer circumferential region.

According to the foregoing structure, by setting the thickness of the second region, i.e., the inner circumferential region located inside the predetermined radius, the outer circumferential region located outside the predetermined radius, or both the inner circumferential region and the outer circumferential region, thicker than the first region where the disk sheet layer is formed, it is possible to increase the mechanical strength of the inner circumferential region, or the outer circumferential region or both the inner circumferential region and the outer circumferential region, thereby suppressing a damage of the disk substrate when being accidentally dropped or set in the recording/reproducing device.

With a combined use of the optical disk and the recording/reproducing device of the optical disk, the present invention permits information to be recorded/reproduced on or from the optical disk of multilayered structure having a plurality of recording faces in the disk sheet layer, thereby realizing a large capacity optical disk.

For a fuller understanding of the nature and advantages of the invention, reference should be made to the ensuing detailed description taken in conjunction with the accompanying drawings.

DESCRIPTION OF THE EMBODIMENTS

The following descriptions will explain an optical disk, an optical disk forming method and an optical disk device of the present invention will be explained in reference to Figures.

[Technical Concepts of the Present Invention)

Figure 1:
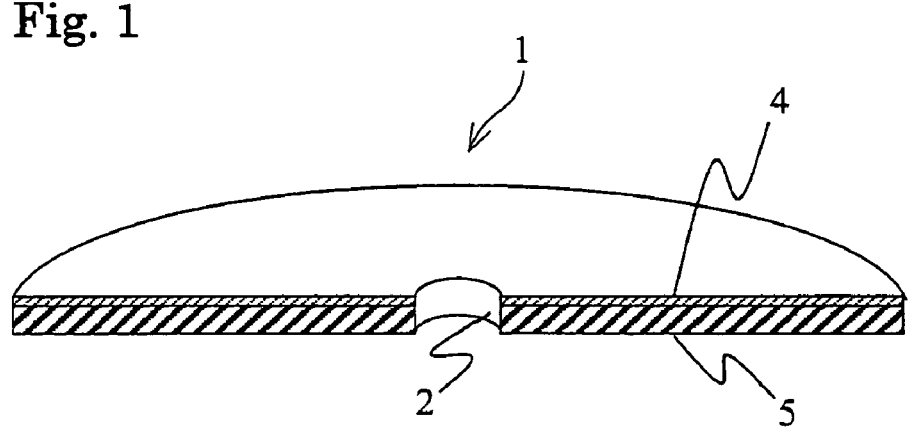
FIG. 1 is a perspective view which explains the structure of an optical disk in accordance with the present invention.

As shown in FIG. 1, an optical disk 1 in accordance with the present invention includes a disk substrate 5, and a disk sheet layer 4 formed on the disk substrate 5. The disk substrate 5 is made up of layered plurality of disk sheets 6 (see FIG. 2). The optical disk 1 may be arranged so as to form an inner circumferential hole 2 for centering.

Figure 2:
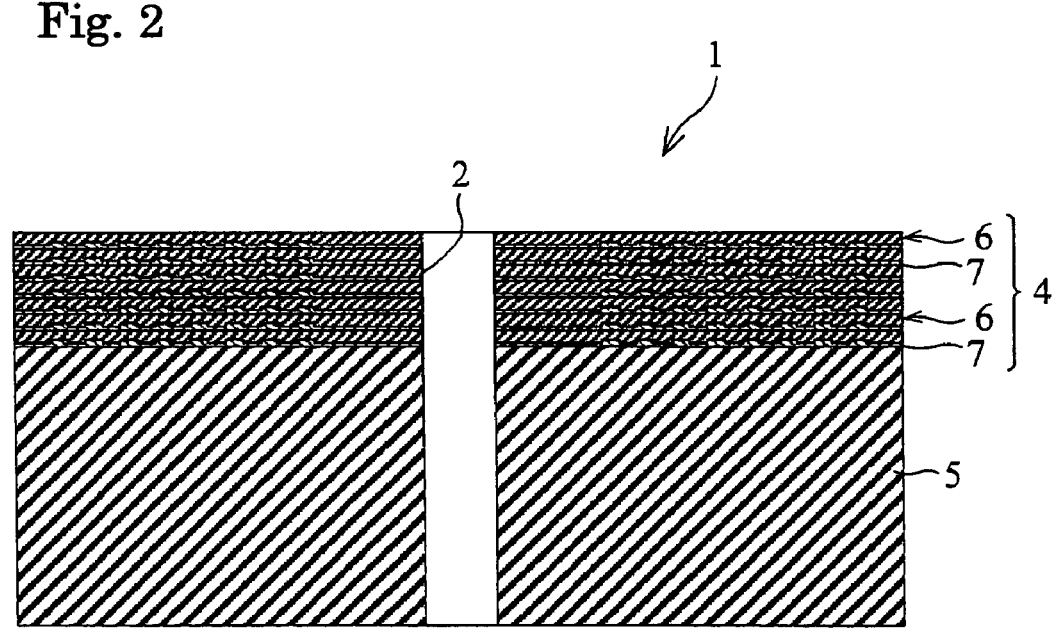
FIG. 2 is a cross-sectional view which explains the structure of the optical disk.

FIG. 2 shows a cross-sectional view of the optical disk 1. FIG. 2 shows the optical disk 1 enlarged only in its thickness direction.

As illustrated in FIG. 2, the optical disk 1 is arranged such that a plurality of disk sheets 6 that are laminated using an adhesive layer 7 are formed as the disk sheet layer 4. Namely, the disk sheet layer 4 has such structure that the disk sheets 6 and the adhesive layers 7 are alternately laminated.

FIGS. 3(a), 3(b), 4(a), and 4(b) explain a recording face 6a of the optical disk 1.

As illustrated in these figures, on the surface of the disk sheet 6, formed are recessed pits 8 (see FIG. 3(a)), and tracks 9 made up of lands 9a and grooves 9b (see FIG. 4(a)).

In the present embodiment, the surface on the side where a pattern of recessions and protrusions of the pits 8 and the tracks 9 of the disk sheet 6 is used as a recording face 6a of the disk sheet 6, and the surface on the opposite side of the recording face 6a is defined to be a back surface 6b of the disk sheet 6. Here, in order to ensure accurate tracking, the level difference between the recessions and protrusions of pits 8, it is preferable that the level difference between the lands 9a and the grooves 9b of the track 9 be set in a range of from 20 nm to 100 nm to ensure an accurate tracking.

Figure 5:
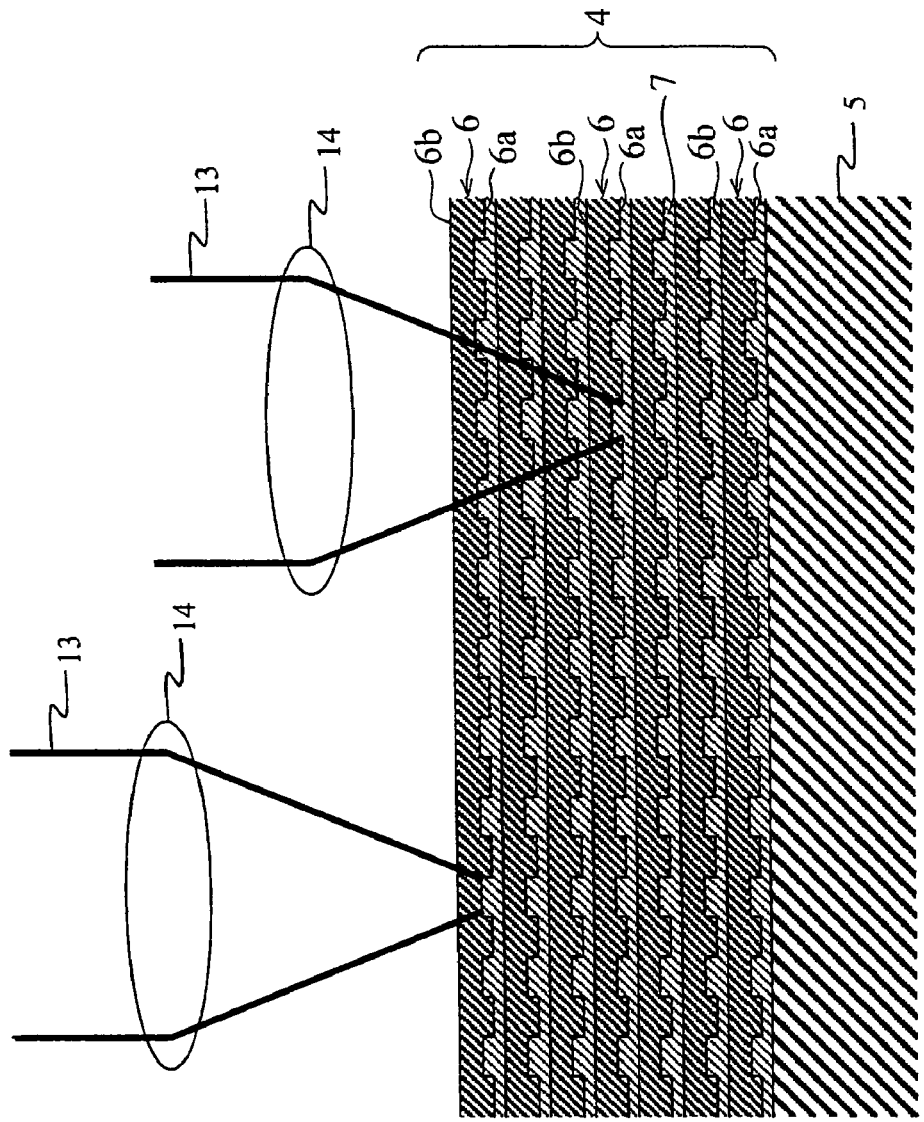
FIG. 5 is a cross-sectional view which explains the structure of the optical disk.

FIG. 5 is an enlarged cross-sectional view of the optical disk 1. As illustrated in FIG. 5, the optical disk 1 includes the disk substrate 5 having a flat surface and a plurality of disk sheets 6 are laminated on the flat surface. Each of the plurality of the disk sheets 6 is arranged such that one of the surfaces serves as the recording face 6a and the other surface, i.e., the back surface 6a has a flat face. These plurality of the disk sheets 6 are laminated by bonding together by means of the adhesive layers 7 in such a manner that the surface of the disk substrate 5 faces the recording face 6a of the disk sheet 6, and between two adjacent disk sheets 6, the recording face 6a of one of the disk sheets 6 faces the back surface 6b of the other disk sheet 6. Namely, the disk sheet layer 4 is made up of the disk sheets 6, each having a flat back surface 6b, and the adhesive layers 7 which are alternately laminated so that respective recording faces 6a of the disk sheets 6 face the disk substrate.

In this state, a light beam 13 is projected onto the respective recording faces 6a of the disk sheets 6 to be focused thereon by respective objective lens 14, and the focusing is adjusted so that the light beam 13 can be focused on each recording race 6a. The focused light beam 13 is subjected to tracking along the bits 8 or the tracks 9 (see FIGS. 3 and 4) with rotations of the optical disk 1, thereby carrying out recording and reproducing operations.

Figure 6:
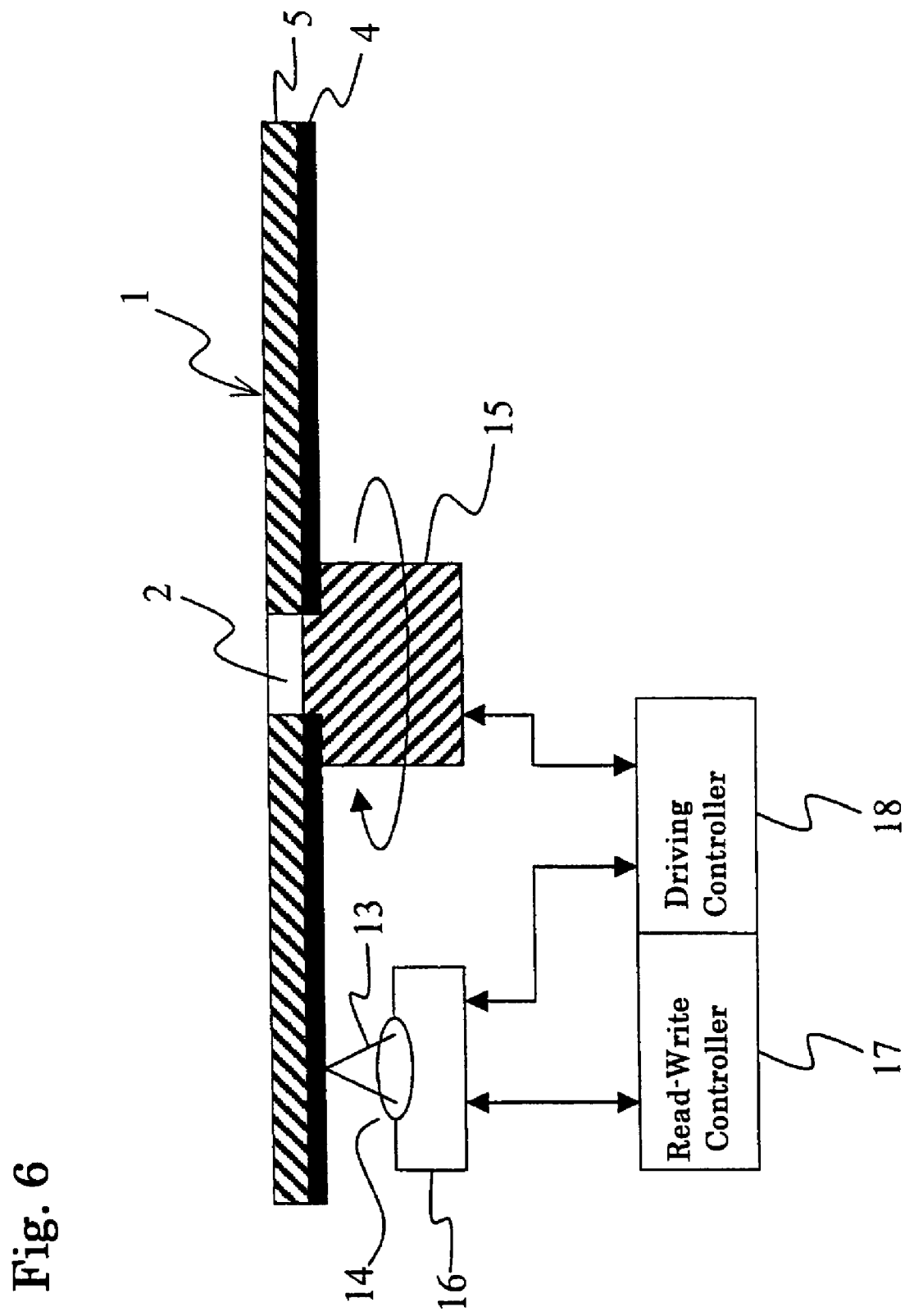
FIG. 6 is an explanatory view which shows the structure of an optical disk recording device or reproducing device of the present invention.

FIG. 6 is a view schematically showing the structure of a disk device for recording and/or reproducing on/from the optical disk 1.

The optical disk 1 is caught by a spindle 15 in the state where the centering is performed by the inner circumferential hole 2, and the optical disk 1 is subjected to the rotation driving. On the other hand, the light beam 13 is controlled by the optical pickup 16. Namely, the optical pickup 16 is made up of a light beam source, an optical detector, a focusing optical system, a tracking optical system, and an objective lens 14 for focusing the light beam. By means of this optical pickup 16, the focusing is performed with respect to the recording face 6a (see FIG. 5) of a specific disk sheet 6 in the disk sheet layer 4 formed on the disk substrate 5, and further the tracking is performed with respect to the pits 8 or the tracks 9 (see FIGS. 3 and 4).

The foregoing optical disk device includes a driving control circuit 18 for controlling the rotation driving of the optical disk 1, the access control of the optical pickup 16, the focusing control and the tracking control, and a recording and/or reproducing control circuit 17 for controlling the light beam intensity, the detection of recording signals and/or the control of recording signals.

In order to reduce the spherical aberration generated by laminating the disk sheet 6, an interval between a pair of the objective lens (relay lens) 14 is stored in the optical pickup 16 with respect to each recording face 6a.

The foregoing optical disk 1 and the reproducing device and the recording device of the optical disk, it is possible to reproduce from or record on the optical disk 1 of a multi-layered structure which includes a plurality of recording faces 6a in the disk sheet layer 4, thereby realizing a large volume optical disk device.

In reference to FIG. 5, explanations have been given through the case where a light beam is incident from the side of the disk sheet 6. However, it is also possible to record or reproduce by projecting a light beam from the side of the disk substrate 5.

However, a problem arises in that when an attempt is made to make a focused beam spot of the optical beam 13 smaller by adopting the objective lens 14 of a large numerical aperture to realize still higher density recording/reproducing, a coma aberration of the light beam may be generated even with a slight tilt of the optical disk 1. Particularly when adopting the objective lens 14 having an NA of not less than 0.70, the adverse effect of the coma aberration becomes extremely large.

Therefore, when a light beam is incident from the disk substrate 5, in particular, it is desirable that the disk sheet 6 or the disk substrate 5 be made thinner.

According to the present invention, the optical disk 1 of large recording capacity can be realized by laminating a plurality of relatively thin disk sheets 6 while maintaining the flatness of the optical disk 1.

(The Structure of the Recording Face 6a)

The optical disk 1 of the present invention can adopt the ROM (Read Only Memory) recording system, WO (Write Once) Recording system which permits recording and reproducing, or the RE (Re-Writable) recording system which permits recording, erasing and reproducing.

[Example Structure of Optical Disk of ROM System]

As illustrated in FIGS. 3(a) and 3(b), the optical disk 1 of the ROM system is arranged so as to record information as pits 8 formed in a recessed shape on the disk sheet 6, and by projecting the light beam to be focused on the pits 8, and detecting the reflected light, it is possible to reproduce information. Here, due to a difference in index of refraction between the disk sheet 6 and the adhesive layer 7, a part of the light beam 13 incident on the recording face 6a, the interface between the disk sheet 6 and the adhesive layer 7, is reflected on to the recording face 6a, and the resulting reflected light is detected by the photo-detector (not shown) in the optical pickup 16. As a result, information is reproduced by reading changes in amount of reflected light due to the presence or absence of the pits 8.

For example, the optical reflectance R at the interface between the disk sheet 6 and the adhesive layer 7 is given as:

$R=((n1-n2)/(n1+n2))^2$, wherein n1 is the index of refraction of the disk sheet 6 and n2 is the index of refraction of the adhesive layer 7.

For example, when a resin sheet made of polycarbonate resin with an index of refraction of 1.58 is adopted for the disk sheet 6, and acrylic ultraviolet curing resin containing fluorocarbon resin having an index of refraction n2 of 1.33 is adopted for the adhesive resin 7, the optical reflectance R at the interface between the disk sheet 6 and the adhesive layer 7 is 0.74%. For example, when projecting a laser beam having an intensity of 30 mW onto the recording face 6a on the light incident side, the intensity of the reflected light from the recording race 6a becomes 221 µW.

In this case, however, a plurality of the interfaces are formed by the plurality of disk sheets 6, and the light beam intensity becomes lower when time the light beam passes through the interface. Namely, the more away from the light incident side, the lower is the intensity of the reflected light from the recording faced 6a, and the intensity of the reflected light is therefore subjected to changes by each recording face 6a.

In response by adjusting the amplification factor etc., of the reproducing signal as detected by the photodetector of the optical pickup 16, it is possible to transmit the reproducing signal of a fixed level to the reproducing control circuit 17.

In this example, explanations have been given through the case of adopting the polycarbonate resin and the acrylic ultraviolet curing resin for the disk sheet 6 and the adhesive layer 7 respectively. However, the materials of the disk sheet 6 and the adhesive layer 7 are not intended to be limited to the above example. For example, non-limited examples for the material of the disk sheet 6 includes: such polyethylene resin sheet as a polyethylene terephthalate (PET) film, a polyethylene naphthalate (PEN) film, or polypropylene resin sheet, and olefin resin sheet.

According to the foregoing structure, a reproducing signal of sufficiently high intensity can be obtained by increasing the difference in index of refraction between the disk sheet 6 and the adhesive layer 7, which, in turn, increases the amount of reflected light from the recording face 6a at the interface between the disk sheet 6 and the adhesive layer 7.

As illustrated in FIG. 3(b), according to the foregoing structure, by providing the reflective film 10 on each recording face 6a of the optical disk 1, it is possible to increase the amount of reflected light from the recording face 6a, and reduce the reproducing power. Here, it is desirable that the film thickness of the reflective film 10 (reflective index) be determined based on the number of recording faces 6a or the position of such recording faces 6a.

Specifically, it is preferable that the reflective film 10 formed on the recording face 6a on the light beam incident side be formed thinner, and the recording face 6a laminated at that position be made more thick, and the film thickness of the reflective film 10 formed on each recording face 6a be controlled so as to realize an equal amount of reflected light from each recording face 6a.

For the material of the reflective film 10, a material having a high reflectance with respect to a reproducing light beam is preferable for the following reason. That is, in the case of adopting the reflective film 10 of low reflectance, it is necessary to increase the film thickness of the reflective film 10 in order to increase the desired amount of reflected light. However, as the absorption increases with an increase in the thickness of the reflective film 10, the amount of light passed through the reflective light is reduced, which causes the reduced number of laminated layers of the recording face 6a.

In view of the foregoing, for the reflective film 10, for example, a metal thin film made of, for example, Al, Au, Pt, Ti, Ag, etc., or an alloy of such metals is preferable.

According to the foregoing optical disk 1 adopting the reflective film 10, the difference in index of refraction between the disk sheet 6 and the adhesive layer 7 cause the generation of reflected light not only from the recording face 6a having formed thereon the reflective film 10 but also from the interface between the back surface 6a of the disk sheet 6 and the adhesive layer 7. In this case, the reflected light beam from the interface reduces the amount of reflected light to be reproduced. It is therefore desirable that the index of refraction of the disk sheet 6 be equal to the index of refraction of the adhesive layer 7.

[Example Structure of Optical Disk of WO System]

As illustrated in FIG. 4(a), the optical disk 1 of the WO system is arranged so as to form tracks 9 made up of lands 9a in a protruded shape and grooves 9b in a recessed shape, on the disk sheet 6. As illustrated in FIG. 4(b), a recording film 11 according to the WO system is formed on the track 9, a focused light beam is subjected to the tracking along the track 9. Then, information is recorded by projecting the pulse like light beam having a relatively low intensity, and information is reproduced by detecting the amount of reflected light of a focused light beam of relatively low intensity.

The recording or reproducing of information may be performed with respect to either the lands 9a or the grooves 9b of the tracks or both the lands 9a and the grooves 9b.

The structure of the optical disk 1 of the WO system is basically the same as the optical disk 1 of the ROM system. However, the optical disk 1 of the WO system differs from the optical disk 1 of the ROM system in that a recording film 11 (see FIG. 4(b)) is formed in replace of the reflective film 10 (see FIG. 3(b)). Further, according to the optical disk 1 of the WO system, with an increase in temperature by projecting a light beam to be focused on the recording film 11, the quality of the recording film 11 or the resin form in the vicinity of the recording film 11 changes, thereby recording information. For the recording layer 11, it is therefore necessary to absorb the light beam appropriately to raise the temperature to the desired temperature.

As compared to the reflective film 10 adopted in the optical disk 1 of the ROM system, for the recording film 11 adopted is a material having a relatively low reflectance, and a high absorption coefficient. For the material of the recording film 11 of the optical disk 1 of the WO system, a phase change material containing as a main component at least two elements selected from the group consisting of Sb, Te, In, Ag and Ge may be adopted. With this structure, information is recorded by projecting a light beam pulse onto the amorphous recording film 11 made of the phase change material to partially change the phase to the polycrystalline state; on the other hand, information is reproduced by detecting changes in difference in index of refraction between the amorphous state and the polycrystalline state.

For other recording film 11 of the optical disk 1 of the WO system, a metal film made of Ta, Si, etc., or an alloy including these metals as a main component may be adopted. When a light beam pulse is projected on to the metal film or the alloy film, the temperature is increase at the irradiated position, and the resin deforms in a vicinity of the irradiated position. Then, by detecting changes in reflectance due to the resin deformation, recorded information can be reproduced.

[Example Structure of Optical Disk of RE System]

The structure of the optical disk 1 of the RE system is the same as the optical disk 1 of the WO system. For the recording film 11 of the optical disk 1 of the RE system, a phase change material containing as a main component at least two elements selected from the group consisting of Sb, Te, In, Ag and Ge may be adopted as in the case of the optical disk 1 of the WO system. With this structure, information is recorded by projecting a light beam pulse onto the amorphous recording film 11 made of the phase change material to partially change the phase to the polycrystalline state; on the other hand, information is erased by projecting a light beam of relatively low intensity to change the phase from the polycrystalline state to the amorphous state. Here, it is preferable that the phase change material has an optimal composition so that the phase change occurs from the amorphous state to the polycrystalline state and from the polycrystalline state to the amorphous state. Incidentally, the recorded information can be reproduced by detecting the difference in reflectance between the amorphous state and from the polycrystalline state.

[First Example Structure of Optical Disk]

FIG. 5 shows the first example structure of the optical disk 1. In the first example structure, a plurality of disk sheets 6 that are laminated using an adhesive layer 7 are formed on the disk substrate 5. Here, one of the surfaces of each disk sheet 6 serves as a recording face 6a, and the other is a flat back surface 6b. These plurality of the disk sheets 6 are laminated by bonding together by means of the adhesive layers 7 in such a manner that the surface of the disk substrate 5 faces the recording face 6a of the disk sheet 6, and between two adjacent disk sheets 6, the recording face 6a of one of the disk sheets 6 faces the back surface 6b of the other disk sheet 6.

On the recording face 6a, formed are pits 8 in a recessed shape (see FIG. 3(a)) or tracks 9 made up of lands 9a and grooves 9b (see FIG. 4(a)) on the recording face 6a. As described, on these pits 8 or tracks 9, formed is the reflective film 10 (see FIG. 3(b)), or the recording film (see FIG. 4(b)) according to the ROM, WO or RE system. In the ROM system, however, neither the reflective film 10 nor the recording film 11 is formed.

The optical disk 1 in accordance with the first example structure is arranged so as to laminate the plurality of disk sheets 6, each having a recording face 6a. With this structure, as compared to the conventional optical disk, wherein an ultraviolet ray curing resin is hardened gradually on the substrate to form recording faces 6a, an applied force to be applied on the optical disk 1 in the process of forming the recording faces 6a is extremely smaller, and the flatness of the optical disk 1 can be maintained with high precision.

Furthermore, when laminating respective disk sheets 6, such problem that an applied force to be applied to the disk sheet 6 becomes small, and the thickness of each disk sheet 6 varies, or each disk sheet 6 is partially distorted is not liable to occur. It is therefore possible to control an interval between the recording faces 6a of adjacent disk sheets 6 with ease.

The plurality of disk sheets 6 are laminated on the disk substrate 5 so that respective recording faces 6a are positioned in the same direction, and it is therefore possible to ensure an equal interval between the recording faces 6a of the adjacent disk sheets 6.

Furthermore, the flat back surface 6b of the disk sheet 6 permits each recording face 6a to be formed with ease, and partial variations in the thickness of the disk sheets 6 generated in the process of forming the recording faces 6a can be suppressed.

One of surfaces of the adhesive layer 7 for use in bonding the adjacent disk sheets 6 together is a flat surface, and thus the process of bonding the disk sheets 6 can be carried out with ease.

According to the foregoing optical disk 1, when recording or reproducing, the coma aberration or the spherical aberration of the light beam can be suppressed, thereby realizing desirable recording and reproducing characteristics.

Other structure of laminating a plurality of disk sheets 6 on the disk substrate 5 than the foregoing structure may be adopted as will be explained below.

[Second Example Structure of Optical Disk]

Figure 7:
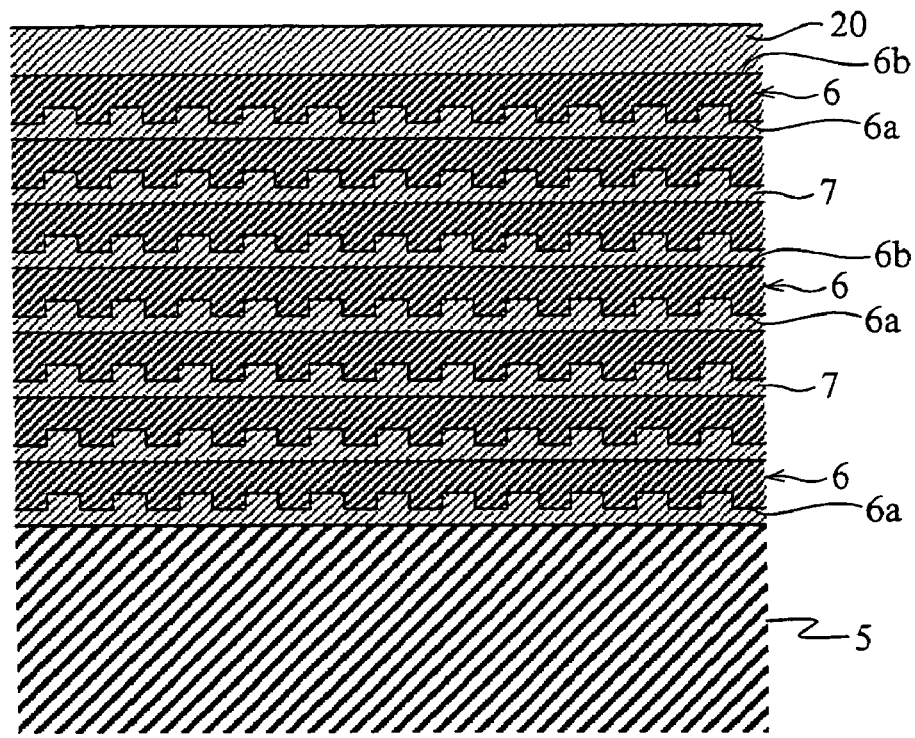
FIG. 7 is a cross-sectional view which explains another structure of the optical disk of the present invention.

FIG. 7 is a cross-sectional view of the second example structure of the optical disk 1.

As illustrated in the FIG. 7, the optical disk 1 in accordance with the second example structure is arranged so as to form a protective layer 20 on the disk sheet 6 formed at position most apart from the disk substrate 5. Here, one of the surfaces of each disk sheet 6 serves as a recording face 6a, and the other is a flat back surface 6b. These disk sheets 6 are laminated by bonding together by means of the adhesive layers 7 in such a manner that the recording faces 6a of the disk sheets 6 face the disk substrate 5. In addition to the structure wherein the plurality of the disk sheets 6, one of the surfaces of each disk sheet 6 serves as a recording face 6a, and the other is a flat back surface 6b, are laminated in such a manner that the surface of the disk substrate 5 faces the recording face 6a of the disk sheet 6, and between two adjacent disk sheets 6, the recording face 6a of one of the disk sheets 6 faces the back surface 6b of the other disk sheet 6, the protective layer 20 is formed on the top most disk sheet 6 of the plurality of laminated disk sheets 6, at position most away from the disk substrate 5.

Incidentally, in order to increase the recording capacity of the optical disk 1, it is preferable that the film thickness of each disk sheet 6 be made smaller so that the disk sheets 6 can be laminated as many as possible.

Without the foregoing protective layer 20, when adopting a thin disk sheet 6 for the top most disk sheet 6, of the optical disk 1 (the disk sheet positioned most away from the disk substrate 5), a scratch generated due to an accidental drop of the optical disk 1, etc., would reach the recording face 6a of the disk sheet 6 at the top most position, which may result in the problem of losing information.

Incidentally, with the structure adopting the thin film for the top most disk sheet 6 without the protective film 20, when projecting the light beam 13 to be focused on the top most disk sheet 6, a distance between the surface of the disk (back surface 7b of the top most disk sheet 6), and the recording face 6a of each disk sheet 6 (the recording face 6a of the top most disk sheet 6 and the recording face 6a of the disk sheet 6 laminated in a vicinity of the top most disk sheet 6, becomes smaller as compared to the case of adopting the protective layer 20 as shown in FIG. 7.

With the foregoing structure without the protective layer 20, the spot diameter of the light beam 13 to be incident on the surface of the optical disk 1 becomes smaller, and an optical path of the light beam 13 would be disturbed due to even a fine scratch or fine dust particles adhered, which makes it difficult to record/reproduce information.

In contrast, according to the optical disk 1 of the second example structure shown in FIG. 7, the protective film 20 is formed on the top most disk sheet 6, and a damage of the recording face 6a due to an accidental drop of the disk, etc., can be prevented.

Additionally, the distance between the surface of the optical disk 1 (surface of the protective layer 20) and the recording face 6a of the disk sheet 6 can be made longer than that of the structure without the protective layer 20, and thus the diameter of the spot of the light beam 13 to be incident on the surface of the optical disk 1 (surface of the protective layer 20) can be made larger. As a result, when carrying out recording or reproducing operation by projecting the light beam 13 on to the top most disk sheet 6 (from the side of the disk sheet layer 4), adverse effects of the scratch or dust particles on the surface of the protective layer 20 onto the recording/reproducing characteristics can be suppressed.

For the material of the protective layer 20, acrylic ultraviolet ray curing resin or epoxy series ultraviolet ray curing resin may be adopted, and the same material as the material of the adhesive layer 7 may be adopted.

Incidentally, to suppress the reflectance of the light beam from the interface (back surface 6b) between the top most disk sheet 6 and the protective layer 20, it is desirable that the index of refraction of the protective layer 20 be equal to the index of refraction of the top most disk sheet 6.

[Third Example Structure of Optical Disk]

Figure 8:
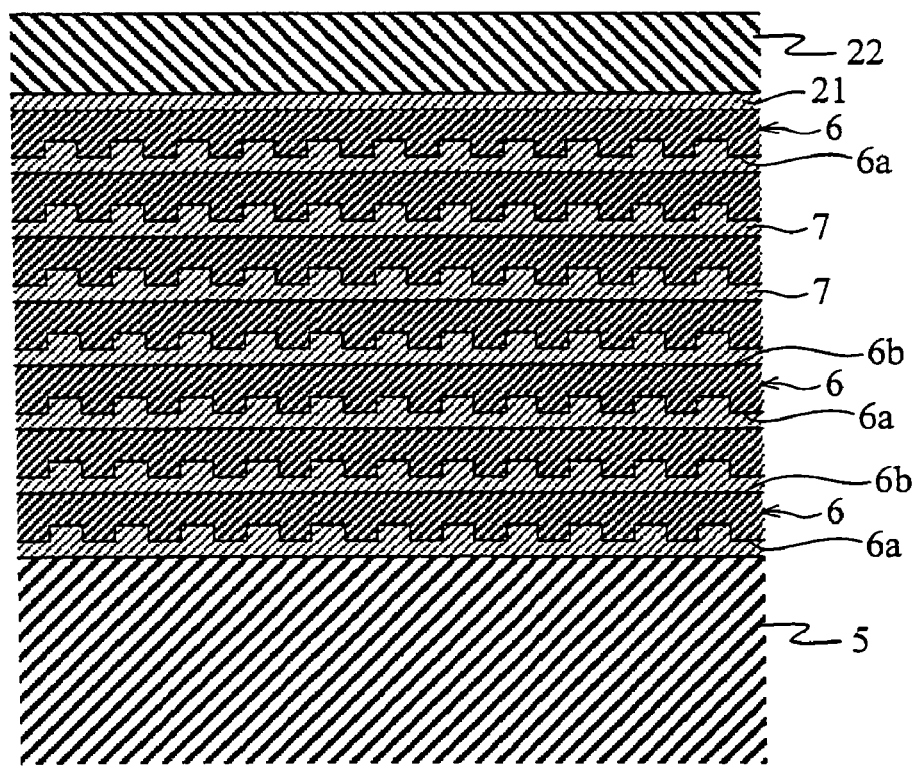
FIG. 8 is a cross-sectional view which explains still another structure of the optical disk of the present invention.

FIG. 8 is an enlarged cross-sectional view of the third example structure of the optical disk 1.

The optical disk 1 shown in FIG. 8 adopts the structure wherein a protective sheet 22 in replace of the protective layer 20 adopted in the second example structure shown in FIG. 7. This protective sheet 22 is laminated by means of an adhesive agent layer 21. Namely, in addition to the structure wherein the plurality of the disk sheets 6, one of the surfaces of each disk sheet 6 serves as a recording face 6a, and the other is a flat back surface 6b, are laminated in such a manner that the surface of the disk substrate 5 faces the recording face 6a of the disk sheet 6, and between two adjacent disk sheets 6, the recording face 6a of one of the disk sheets 6 faces the back surface 6b of the other disk sheet 6, the protective sheet 22 is laminated on the top most disk sheet 6 of the plurality of laminated disk sheets 6 by means of the adhesive agent layer 21, at a position most away from the disk substrate 5.

The foregoing third example structure offers the effects as achieved from the second example structure. That is, the recording face 6a can be prevented from being damaged by adopting the protective sheet 22, and when carrying out recording or reproducing operation, adverse effects of the scratch or dust particles on the surface of the optical disk 1 (surface of the protective sheet 22) onto the recording/reproducing characteristics can be suppressed.

The protective film 20 adopted in the second example structure is formed by applying liquid ultraviolet ray curing resin by the spin coating method and further curing the ultraviolet ray with an application of an ultraviolet ray. Therefore, the thickness of the protective film 20 may differ between the inner circumference and the outer circumference of the disk. In contrast, according to the third example structure wherein the protective sheet 22 with an uniform film thickness is laminated onto the back surface 6b of the top most disk sheet 6 by means of the thin adhesive agent layer 21, variations in thickness of the surface portion of the optical disk (the protective sheet 22 and the adhesive agent layer 21 at portions corresponding to the protective layer 20 of the second example structure) can be suppressed.

Variations in thickness of the layer cause an increase in the coma aberration or the spherical aberration of the focused light beam projected from the side of the disk sheet layer 4 when recording or reproducing. Therefore, it is effective to suppress variations in layer thickness by adopting the protective sheet 22 to maintain a desirable focused light beam, thereby realizing desirable recording and reproducing characteristics.

[Fourth Example Structure of Optical Disk]

Figure 9:
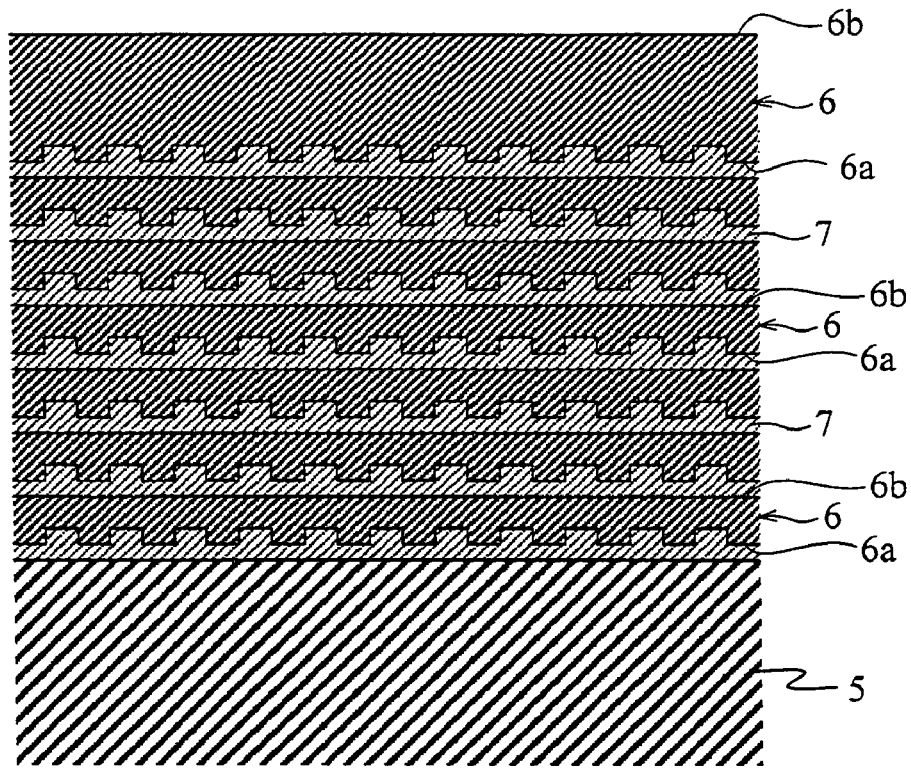
FIG. 9 is a cross-sectional view which explains still another structure of the optical disk of the present invention.

FIG. 9 is an enlarged cross-sectional view of the fourth example structure of the optical disk 1.

The optical disk 1 shown in FIG. 9 has the similar structure as the optical disk 1 in accordance with the first example structure (see FIG. 5), and differs from that of FIG. 5 in that the thickness of the top most disk sheet 6 is thicker than other disk sheets 6. Namely, in addition to the structure wherein the plurality of the disk sheets 6, one of the surfaces of each disk sheet 6 serves as a recording face 6a, and the other is a flat back surface 6b, are laminated in such a manner that the surface of the disk substrate 5 faces the recording face 6a of the disk sheet 6, and between two adjacent disk sheets 6, the recording face 6a of one of the disk sheets 6 faces the back surface 6b of the other disk sheet 6, the thickness of the top most disk sheet 6 laminated at a position most away from the disk substrate 6 is formed thicker than that of any other laminated disk sheets 6.

According to the fourth example structure, by making the top most disk sheet 6 thicker, a scratch as generated due to an accidental drop of the disk, etc., can be prevented from reaching the recording face 6a (the recording face 6a of the top most disk sheet 6 in particular).

Figure 10:
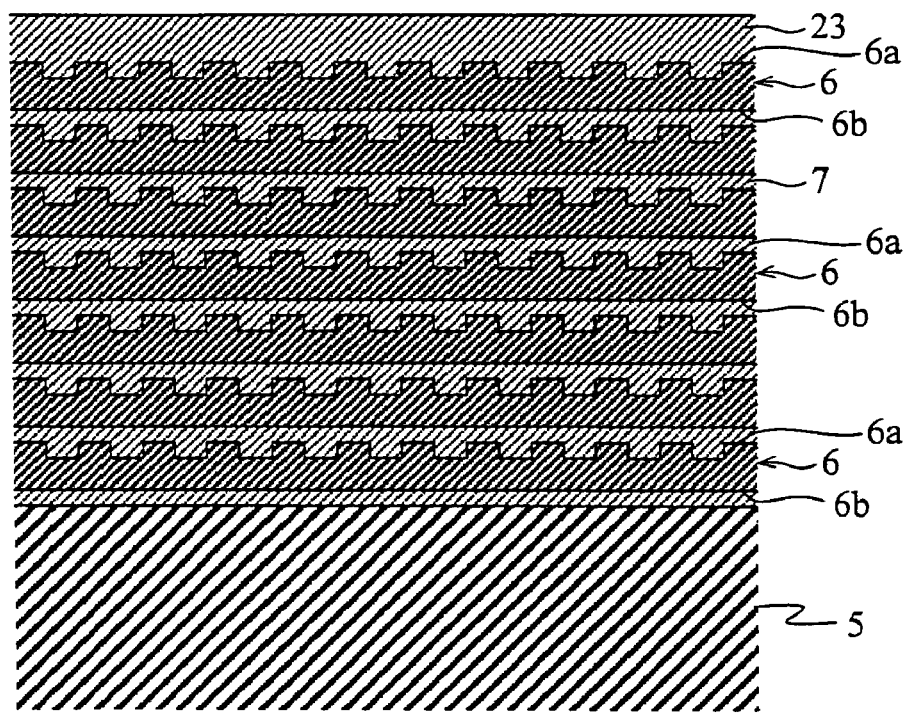
FIG. 10 is a cross-sectional view which explains still another structure of the optical disk of the present invention.
Figure 11:
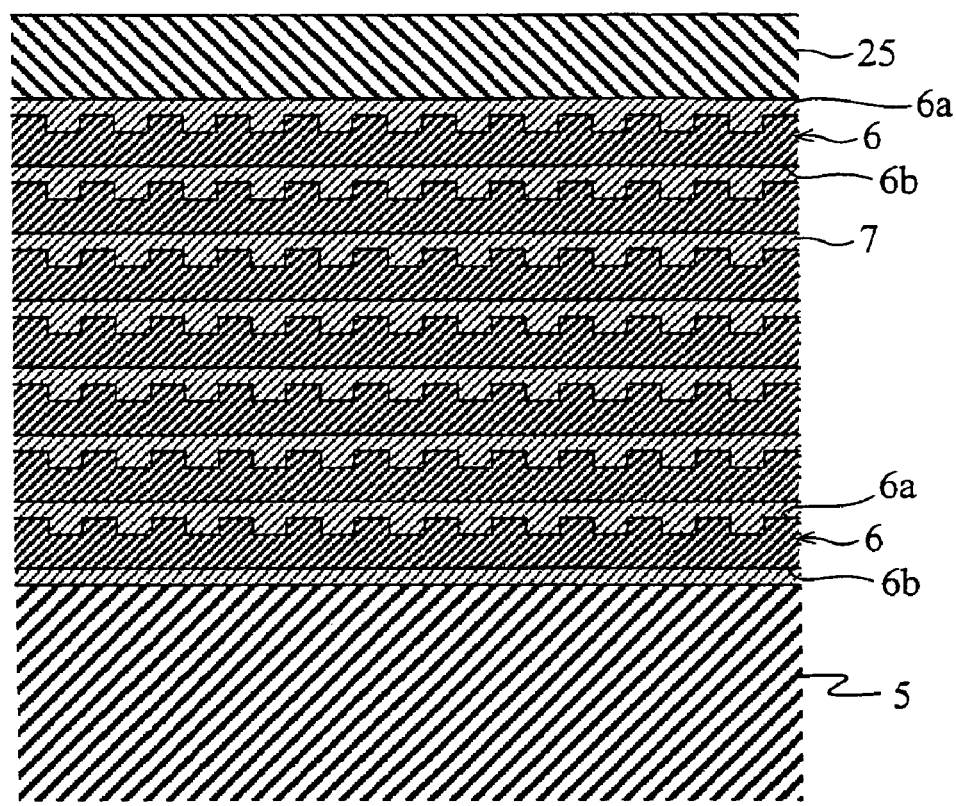
FIG. 11 is a cross-sectional view which explains still another structure of the optical disk of the present invention.

Incidentally, the distance between the surface of the optical disk 1 (back surface 6b of the top most disk sheet 6) and the recording face 6a of the disk sheet 6 can be made larger than that in the first example structure (the top post disk sheet 6 is formed in the same thickness as other disk sheets 6), and the diameter of the spot of the light beam 13 (see FIG. 5) to be projected onto the surface of the disk 1 can be made larger. As a result, when carrying out the recording or reproducing operation, adverse effects of the scratch or dust particles on the surface of the optical disk 1 onto the recording/reproducing characteristics can be suppressed. The foregoing second example structure and the third example structure may be modified as shown in FIG. 10 and FIG. 11 wherein the disk sheets 6 are laminated in a reversed order so that the recording faces 6a and the back surfaces 6b face the disk substrate 5 in an opposite direction, and the foregoing effects as achieved from the structures of the second and third example structures can be achieved also from these modified example structures. In the modified example structure of FIG. 10, the protective layer 23 is the same as the protective layer 20 shown in FIG. 20, and in the modified example structure of FIG. 11, the protective sheet 25 is the same as the protective sheet 22 of FIG. 8.

[Process of Forming Disk Sheet (Recording Face Forming Process)]

The disk sheet 6 may be formed in a band shaped sheet by either the method i) or the method ii).

i) A band shaped sheet material (sheet material) is depressed onto a stamper having a pattern of protrusions and recession corresponding to pits and tracks for the optical disk, by means of a roller or a holding member, to mechanically copy the pattern of protrusions and recessions, to be formed into the band shaped sheet; and ii) An ultraviolet ray curing resin layer formed in a uniform thickness between the band shaped sheet material and a stamper is hardened with an application of an ultraviolet ray, and the pattern of protrusions and recession corresponding to pits and tracks for the optical disk are copied, to be formed into the band shaped sheet.

[First Method of Forming Disk Sheet]

Figure 12:
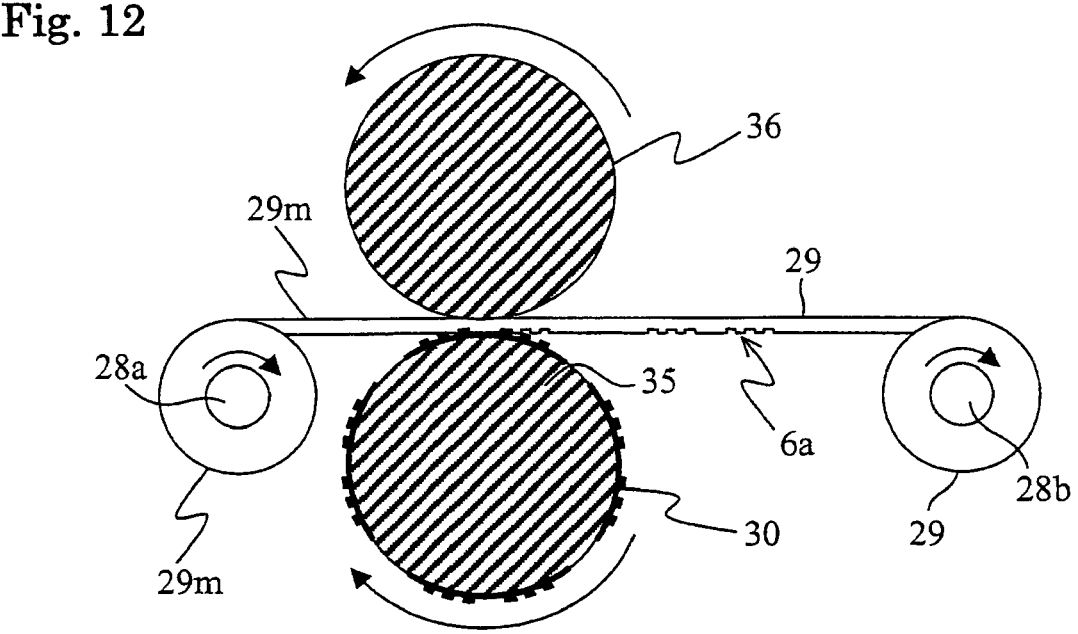
FIG. 12 is a cross-sectional view which explains a method of forming a disk sheet in accordance with the present invention.

FIG. 12 is a cross-sectional view of the first disk sheet forming method.

Firstly, a band-shaped sheet material 29m wound in a roll on the sheet roller 28a is conveyed to a spacing between the first rotation roller 35 provided with a stamper 30 on its surface and a second rotation roller 36 without having the pattern of protrusions and recessions formed on its surface. Here, the stamper 30 has the pattern of protrusions and recessions formed thereon, which correspond to the recording face 6a (pits and tracks). The first rotation roller 35 and the second rotation roller 36 are formed almost in the same shape, and are placed so as to face each other with an interval corresponding to the thickness of the band-shaped disk sheet 29.

Next, the band-shaped sheet material 29m is depressed by the first rotation roller 35 and the second rotation roller 36, so as to mechanically copy the pattern of protrusions and recessions corresponding to the recording face 6a (pits and tracks) onto the band-shaped recording face 6a.

The band-shaped disk sheet 29 is then transported from the sheet roller 28a with rotations of the first rotation roller 35 and the second rotation roller 36 to be wound up by the sheet roller 28b.

The foregoing method is arranged so as to place the band-shaped sheet material 29m in the spacing between the first rotation roller 35 and the second rotation roller 36, and the band-shaped sheet material 29m is depressed by the first rotation roller 35 and the second rotation roller 36. These first and second rotation rollers 35 and 36 are formed in substantially the same shape, and are placed so as to face each other.

Therefore, the respective depression forces are exerted from the above and the bottom onto the band-shaped sheet material 29m substantially symmetrically, and the band-shaped sheet material 29 having copied thereto the pattern is not liable to be curled.

As a result, it is possible to copy the pattern of protrusions and recessions formed on the stamper 30 accurately onto the band-shaped sheet material 29m with accuracy.

According to the foregoing method, the bending force is hardly exerted onto the plurality of band-shaped disk sheets 29 in the direction of bending them in the subsequent process (laminating the band-shaped disk sheet 29 shown in FIG. 20), even when adopting a large number of band-shaped disk sheets 29 to be laminated onto the disk substrate material 50. As a result, it is possible to manufacture optical disks 1 without the problem of much deformation even when adopting a fatigue disk substrate material 50.

As a result, the disk substrate material 50 can be made thinner, which in turn makes the overall thickness of the optical disk 1 thinner.

Incidentally, the foregoing first forming method may be arranged so as to heat the first rotation roller 35 and the second rotation roller 36 beforehand to a vicinity of a softening point so that the pattern can be copied under desirable conditions.

[Second Method of Forming Disk Sheet]

Figure 13:
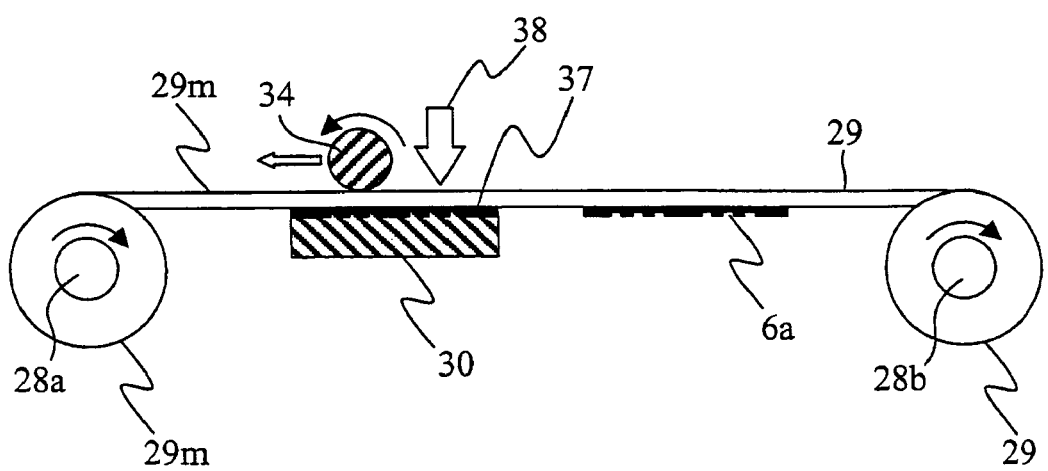
FIG. 13 is a cross-sectional view which explains another method of forming a disk sheet in accordance with the present invention.

FIG. 13 is a cross-sectional view which shows the fourth method of forming the disk sheet 6.

According to the first method of forming the disk sheet 6, a recording face 6a is formed by mechanically deforming the band-shaped sheet material 29m with an applied depression force. In contrast, according to the second method of forming the disk sheet 6, the recording face 6a made up of ultraviolet ray curing resin is formed on the band-shaped sheet material 29m.

Firstly, a band-shaped sheet material 29m wound in a roll on a sheet roller 28a is conveyed towards a stamper 30 having formed thereon the pattern of protrusions and recessions corresponding to the recording face 6a (pits and tracks).

Next, on the band-shaped disk sheet 29 or the stamper 30, liquid ultraviolet ray curing resin layer 37 is applied so as to form the ultraviolet ray curing resin layer 37 between the band-shaped sheet material 29m and the stamper 30.

Next, the band-shaped disk sheet 29 is depressed by the rotation roller 34 onto the stamper 30 to make the thickness of the ultraviolet ray curing resin layer 37 uniform, and the band-shaped sheet material 29m and the stamper 30 are not moved in the direction of transporting the band-shaped sheet material 29m, and only the rotation roller 34 rotates to move in the direction of an arrow, while depressing the band-shaped sheet material 29m.

After the rotation roller 34 is moved by rotating, an ultraviolet ray 32 is applied from the side of the band-shaped disk sheet 29 to cure the ultraviolet ray curing resin 37. As a result, it is possible to copy the pattern of protrusions and recessions onto the ultraviolet ray curing resin layer 37.

After being cured, the ultraviolet ray curing resin 37 is removed from the stamper 30, thereby forming the band-shaped disk sheet 29 having the recording face 6a made of ultraviolet ray curing resin.

The resulting band-shaped disk sheet 29 is then wound up onto the sheet roller 28b, and in the meantime, a new band-shaped sheet material 29m is conveyed towards the stamper 30, and the foregoing process is repeated.

In the foregoing fourth method of forming a disk sheet, the ultraviolet ray 38 is applied from the side of the band-shaped sheet material 29m; however, in the case of adopting a transparent stamper 30, such as a glass stamper 30 having formed thereon a pattern of protrusions and recessions, it is possible to apply an ultraviolet ray from the side of the stamper 30.

According to the foregoing method, it is possible to copy the pattern of pits and tracks formed on the stamper 3 onto the ultraviolet ray curing resin layer 37 in an efficient manner, thereby realizing the process of forming optical disks 1, which permits optical disks 1 to be manufactured with excellent productivity.

As a result, a smaller size optical disk manufacturing device can be realized at low costs, which in turn reduces the cost of the optical disk 1.

In the foregoing method, only the rotation roller 34 is moved by rotating in a direction of an arrow; however, it may be also arranged such that without moving the rotation roller 34 in the transport direction of the band-shaped sheet material 29m, the stamper 30 may be moved in the direction opposite to the direction of an arrow in the Figure by a predetermined distance from the initial position while depressing the band-shaped sheet material 29m.

[Method of Forming Reflective Film and Recording Film]

A read-only multi-layered Optical Disk of the ROM system may be manufactured in the following manner. That is, the band-shaped disk sheet 29, on which the recording face 6a having formed thereon the pattern of protrusions and recessions in the form of pits is formed, as manufactured in the foregoing method, is placed on the disk substrate 5, to be bonded together by means of an adhesive layer 7 having a different index of refraction from that of the band-shaped disk sheet 29, and the resulting laminated structure is processed in a form of a disk.

Figure 3:
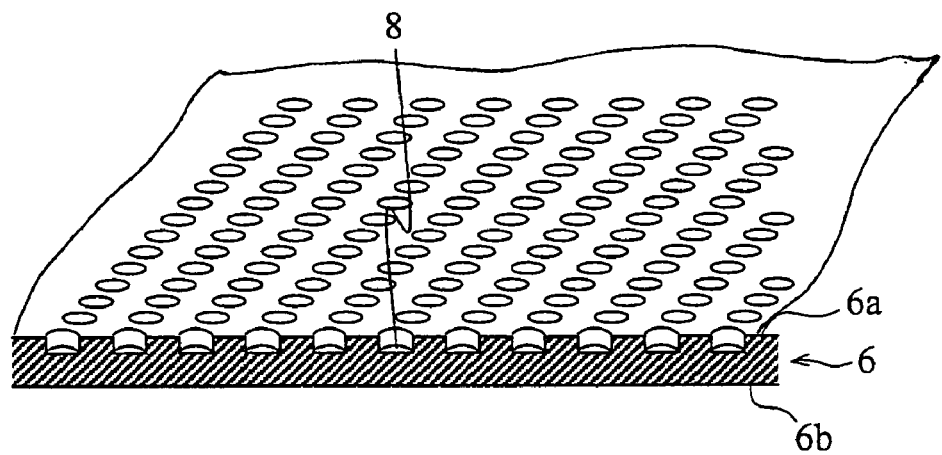
FIG. 3(a) and FIG. 3(b) are perspective views which explain the structure of a recording face of a disk sheet of the present invention.
Figure 3:
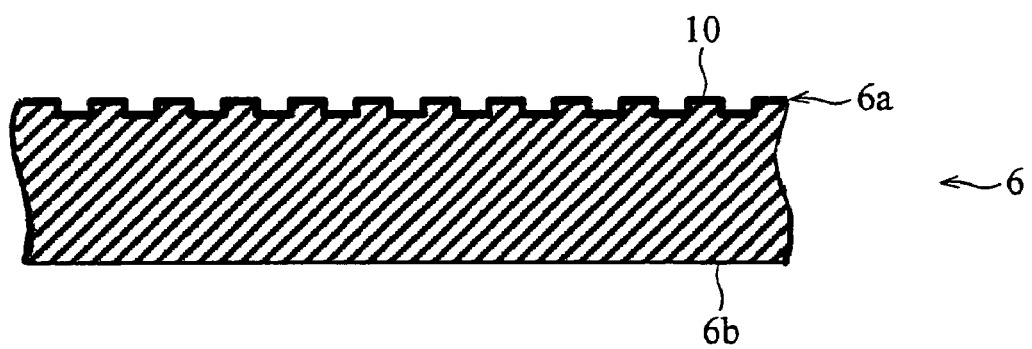

It should be noted here that it is preferable that the reflective film 10 be formed on the recording face 6a (see FIG. 3(*b*)) to optimize the amount of reflected light from the recording face 6a also for the multi-layered optical disk of the ROM system.

Figure 4:
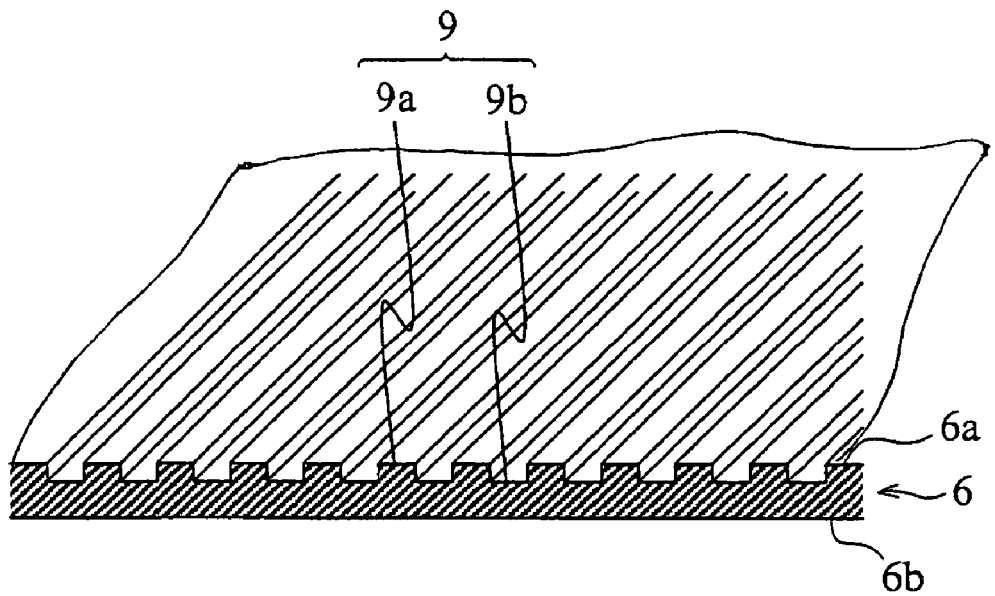
FIG. 4(a) and FIG. 4(b) are perspective views which explain the structure of a recording face of a disk sheet of the present invention.
Figure 4:
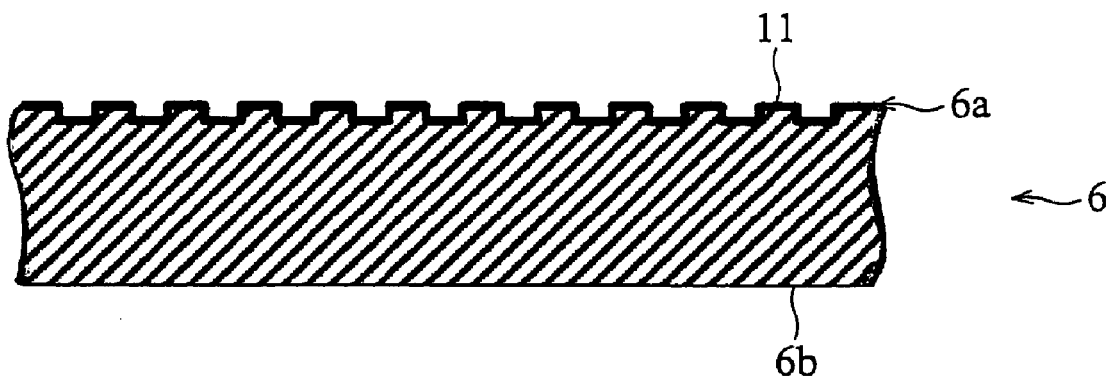

For the multi-layered optical disk of the WO system or the multi-layered optical disk of the RE system, it is necessary to form a recording film 11 (see FIG. 4(*b*)) on the recording face 6a made up of the pattern of protrusions and recessions in the form of tracks.

Figure 14:
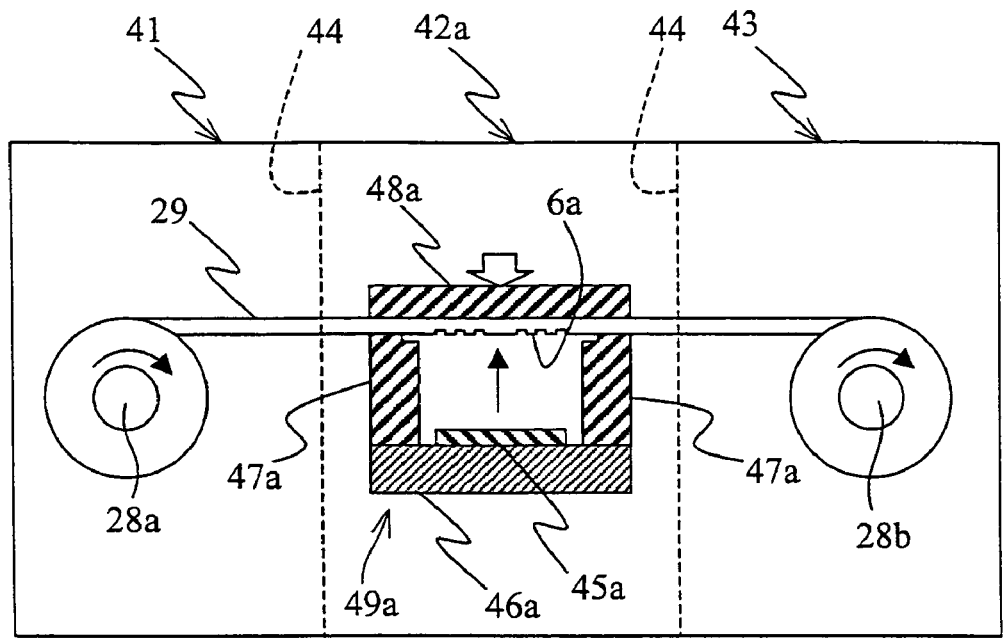
FIG. 14 is a cross-sectional view which explains a device for forming a reflective film or a recording film on the disk sheet.
Figure 15:
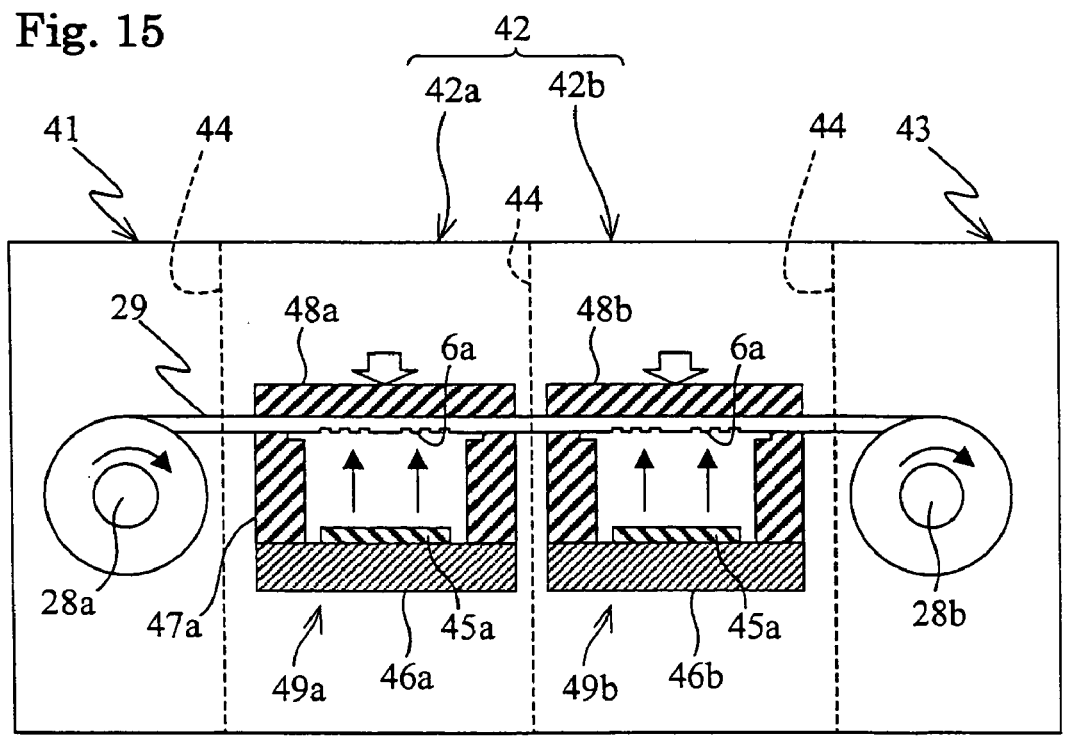
FIG. 15 is a cross-sectional view which explains another device for forming a reflective film or a recording film on the disk sheet.

FIG. 14 is a cross-sectional view showing the method of forming the reflective film 10 and the recording film 11 by the vacuum device.

The vacuum device is made up of a first vacuum chamber 41, a film forming chamber 42a, and a second vacuum chamber 32. The film forming chamber 42a is positioned between the first vacuum chamber 41 and the second vacuum chamber 43. In the first vacuum chamber 41, provided is a sheet roller 28a on the outgoing side, and in the second vacuum chamber 43, provided is a sheet roller 28b on the winding side.

At a boundary between the first vacuum chamber 41 and the film forming chamber 42a adjacently disposed and a boundary between the film forming chamber 42a and the second vacuum chamber 43, formed are vacuum valves 44 respectively. With this structure, when the sheet rollers 28a and 28b are to be exchanged, the vacuum valves 44 is closed, and the only the first vacuum chamber 41 and the second vacuum chamber 43 are set in the atmosphere pressure so that the required minimum space is set in the atmosphere pressure.

In the film forming chamber 42a, provided is a sputtering chamber 49a having a ring-shaped shield 47a for limiting the film forming region, a support member 48a for supporting a band-shaped disk sheet 29 together with the ring-shaped shield 47a and a cooling table 46a.

In the film forming chamber 42, the band-shaped disk sheet 29 is fixed by the ring-shaped shield 47 and the support member 48, to form a film. After forming the film, the band-shaped disk sheet 29 is transported by the sheet roller 28a on the outgoing side and the sheet roller 28b on the winding side.

In the following, the method of forming the reflective film 10 and the recording film 11 will be explained.

In the present embodiment, the film is formed by the roll to roll, and the band-shaped disk sheet 29 on which the recording face 6a made up of the pattern of protrusions and recessions in the form of pits or tracks is formed is wound on the outgoing side sheet roller 28a beforehand.

First, in order to form the reflective film 10 or the recording film 11, first, the band-shaped disk sheet 29 is transported from the sheet roller 28a on the outgoing side to the film forming chamber 42a.

In the film forming chamber 42a, the band-shaped disk sheet 29 is fixed as being sandwiched between the ring-shaped shield 47a and the support member 48a. In this state, the power is applied to the sputter target 45a fixed to the cooling table 46a, and the sputtering is carried out, thereby forming the reflective film 10 or the recording film 11 on the recording face 6a.

Thereafter, the band-shaped disk sheet 29 is wound on the sheet roller 28b on the winding side.

When forming the multi-layered optical disk of the ROM system, a metal thin film made of metal of high reflective index such as Al, Au, Pt, Ti, Ag, etc., or an alloy including such metal may be adopted for a sputtering target 45a. As a result, it is possible to optimize the reflective index of each recording layer 11.

When forming the multi-layered optical disk of the WO system or the RE system, a film made of a phase change material containing as main components, two elements selected from the group consisting of Sb, Te, In, Ag, Ge, or a metal film of Ta, Si, etc., or an alloy film containing these metals as main components.

In the foregoing process, a film is formed on the band-shaped disk sheet 29 after all the patterns have been formed. It is therefore not necessary to repeat the alternate process of forming the pattern (pits or tracks, for example) and of forming a film as required in the conventional method.

Figure 25:
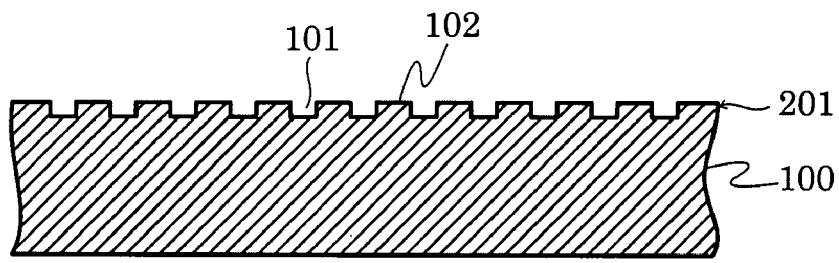
FIGS. 25(a) to 25(c) are cross-sectional views which explain a conventional method of forming a conventional optical disk forming method.
Figure 25:
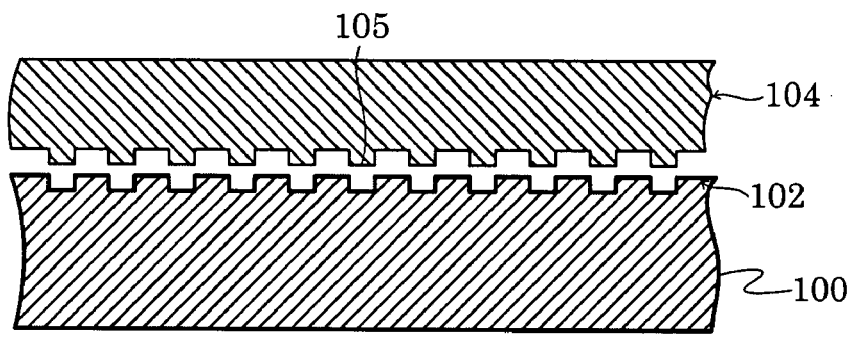
Figure 25:
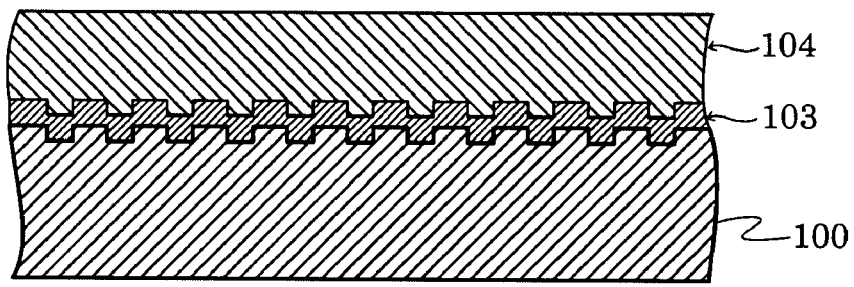
Figure 26:
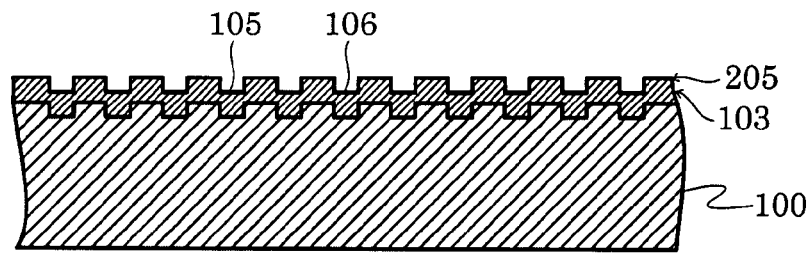
FIGS. 26(a) to 26(c) are cross-sectional views which explain a conventional method of forming a conventional optical disk forming method.
Figure 26:
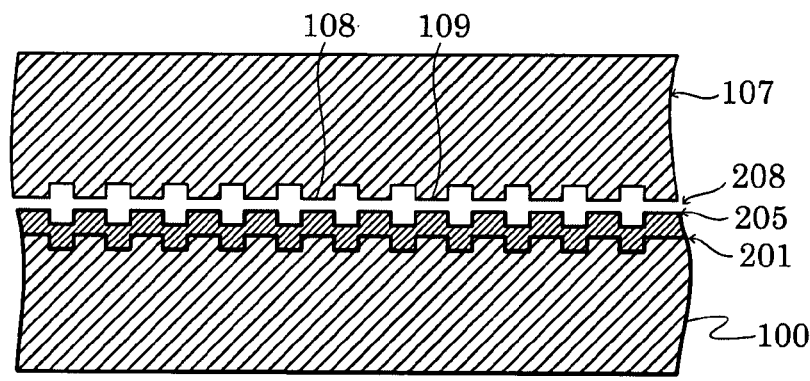
Figure 26:
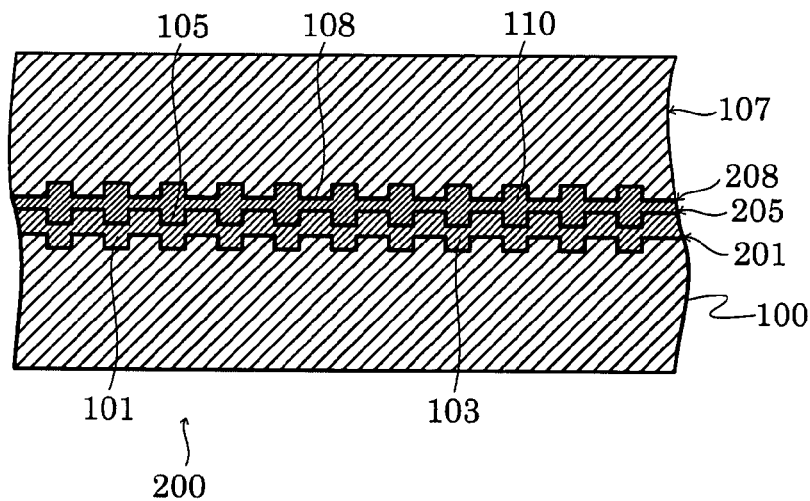

In the conventional process, it is necessary to repeat the processes shown in FIGS. 25(b) and 25(c) many times, to form a plurality of first ultraviolet ray curing resin layers 103 and second reflective layers 106. Further, in the case of forming a multi-layered optical disk, after forming the first ultraviolet ray curing resin layers 103, it is necessary to form the second reflective film 106 using the vacuum evaporation device, or the sputtering device or other vacuum device, and take out the optical disk having formed thereon the second reflective layer 106 from the vacuum device, and then to repetitively form the ultraviolet ray curing resin layer 103 and the reflective layer 106.

[Fifth Example Structure of Optical Disk]

Figure 16:
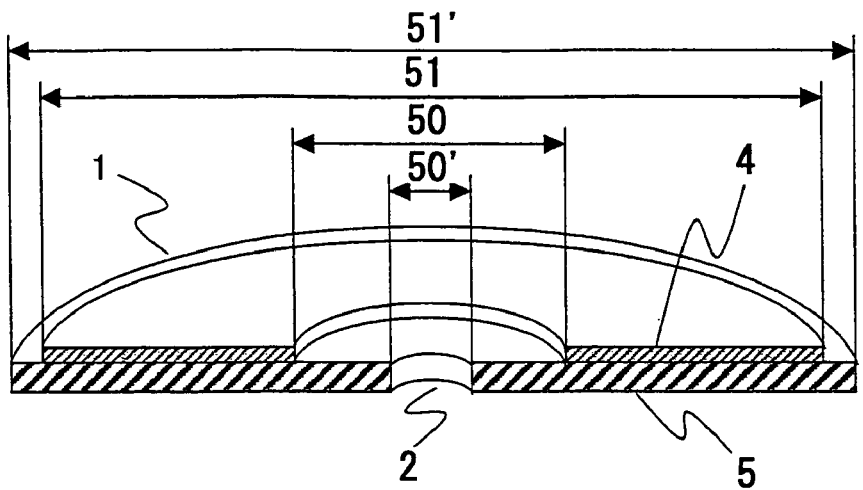
FIG. 16 is a perspective view which explains the structure of an optical disk in accordance with the present invention.
Figure 17:
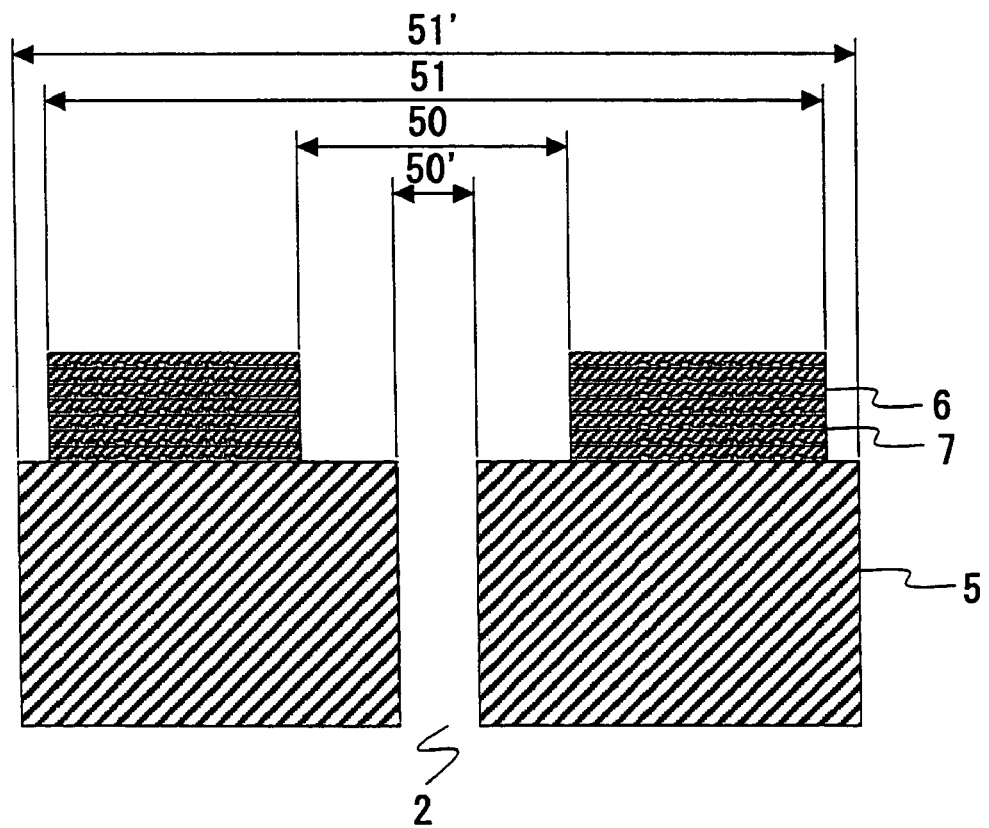
FIG. 17 is a cross-sectional view which explains the structure of the optical disk in accordance with the present invention.

For example, as illustrated in FIG. 16 of a perspective cross-sectional view of the optical disk 1, the optical disk 1 of the present invention includes a disk sheet layer 4 formed on the disk substrate 5. Further, as illustrated in FIG. 17 which is a cross-section of FIG. 16 enlarged in the thickness direction, the disk sheet layer 4 is formed by laminating a plurality of disk sheets 6 being bonded using the adhesive agent 7. On the recording face, i.e., one of the surfaces of each disk sheet 6, information is recorded in the pattern of protrusions and recessions in the spiral or centric form. Incidentally, the disk substrate 5 may include the inner circumferential hole 2 for centering when rotation driving the optical disk 1.

Here, the inner diameter 50 of the disk sheet layer 4 is set larger than the inner diameter 50' of the disk substrate 5, and the outer diameter 51 is set smaller than the outer diameter 51' of the disk substrate. In the following, explanations will be given through the case where both the inner diameter 50 and the outer diameter 51 satisfy the above conditions. However, the effect of the present invention can be achieved as long as either the inner diameter 50 or the outer diameter 51 satisfies the above conditions.

By adopting the foregoing optical disk 1, and the optical disk reproducing device or the optical disk recording device, it is possible to reproduce or record information on and from the optical disk 1 including the plurality of recording faces 6a, thereby realizing a large volume optical disk device.

As illustrated in FIG. 16, the optical disk 1 of the present invention is arranged such that the inner diameter 50 of the disk sheet layer 4 is larger than the inner diameter 50' of the disk substrate 5. Therefore, as illustrated in FIG. 6, when caching the optical disk 1 to the spindle 15, the disk substrate 5 contacts the spindle 15, and the disk sheet layer 4 does not contact the spindle 15 or any other members.

For the optical disk 1 of the present invention, it is preferable that the disk sheet 6 be set in the optical disk recording device or reproducing device without contact in view of the following problem. That is, the disk sheet layer 4 at the inner circumference of the optical disk is separated from the disk substrate 5, or from the adjacent disk sheet 6. As described, according to the optical disk 1 of the present invention wherein the inner diameter 50 of the disk sheet layer 4 is set larger than the outer diameter 51' of the disk substrate 5, the problem of the disk sheet layer 4 at the central hole of the optical disk 1 being separated from the disk substrate 5 or from the adjacent disk sheet 6 can be suppressed. For example, for the handling (evaluating) the optical disk 1, when inserting a jig in the central hole of the optical disk 1 or fixing/holding the optical disk 1, by setting the inner diameter 50 of the disk sheet layer 4 be equal to the inner diameter 51' of the optical disk 5, the disk sheet layer 4 can be maintained at a fixed position by the jig together with the disk substrate 5. In this case, as the jig contacts the central hole of the disk sheet layer 4, it is more likely that the disk sheet layer 4 be separated from the disk substrate 5 or the disk sheet 6 be separated from the adjacent disk sheet 6.

In contrast, according to the structure wherein the inner diameter 50 of the disk sheet layer 4 is larger than the inner diameter 51' of the disk substrate 5, the jig for handling the optical disk 1 holds only the central hole of the disk substrate 5 at a fixed position, and the jig does not contact the central hole of the disk sheet layer 4. Therefore, the disk sheet layer 4 can cannot be separated from the disk substrate 5 and from the adjacent disk sheet 6, thereby providing a highly reliable optical disk 1. When setting the optical disk 1 in the recording/reproducing device, the central hole of the optical disk 1 is held with respect to the rotation spindle 15 at a fixed position. Therefore, by setting the inner diameter 50 of the disk sheet layer 4 larger than the inner diameter 51' of the disk substrate 5, the problem of the disk sheet layer 4 at the central hole of the optical disk 1 being separated from the disk substrate 5 or from the adjacent disk sheet 6 can be suppressed, thereby providing a highly reliable optical disk 1.

The optical disk 1 of the present invention is arranged such that the outer diameter 51 of the disk sheet layer 4 is set smaller than the outer diameter 51' of the disk substrate 5. To set or take out the optical disk 1 in or from the optical disk reproducing device or recording device shown in FIG. 6, when handling the circumferential edge of the optical disk 1, the outer circumferential edge of the disk substrate 5 is handled, and the disk sheet layer 4 does not contact any member (The handling of the disk sheet is never handled). In the optical disk 1 of the present invention, it is preferable that the handling of the disk sheet 6 be not performed when the optical disk 1 is set in or take out of the optical disk reproducing or recording device because such problem of the disk sheet layer 4 at the outer circumference of the optical disk sheet being separated from the disk substrate or from the adjacent disk sheet 6, or the disk sheet 6 being separated from the adjacent optical sheet 6 can be suppressed.

As described, the optical disk 1 of the present invention is arranged such that the outer diameter 51 of the disk sheet layer 4 is set smaller than the outer diameter 51' of the disk substrate 5, and such problem of the disk sheet layer 4 at the outer circumference of the optical disk 1 being separated from the disk substrate or from the adjacent disk sheet 6, or the disk sheet 6 being separated from the adjacent optical sheet 6 can be suppressed, thereby providing a highly reliable optical disk 1. The optical disk 1 of the present invention is arranged such that the outer diameter 51 of the disk sheet layer 4 is set smaller than the outer diameter 51' of the disk substrate 5. To set or take out the optical disk 1 in or from the optical disk reproducing device or recording device shown in FIG. 6, when handling the circumferential edge of the optical disk 1, the outer circumferential edge of the disk substrate 5 is handled, and the disk sheet layer 4 does not contact any member (The handling of the disk sheet is never handled). In the optical disk 1 of the present invention, it is preferable that the handling of the disk sheet 6 be not performed when the optical disk 1 is set in or take out of the optical disk reproducing or recording device because such problem of the disk sheet layer 4 at the outer circumference of the optical disk being separated from the disk substrate or from the adjacent disk sheet 6, or the disk sheet 6 being separated from the adjacent optical sheet 6 can be suppressed. For example, for the handling of the optical disk 1, when fixing the outer circumference of the optical disk 1 with a jig, by setting the outer diameter 51 of the disk sheet layer 4 be equal to the outer diameter 51' of the optical disk 5, the disk sheet layer 4 can be maintained at a fixed position by the jig together with the disk substrate 5. In this case, as the jig contacts the disk sheet layer 4, it is more likely that the disk sheet layer 4 be separated from the disk substrate 5 or the disk sheet 6 be separated from the adjacent disk sheet 6. In contrast, with the structure wherein the outer diameter 51 of the disk sheet layer 4 is smaller than the outer diameter 51' of the disk substrate 5, the jig contacts only the outer circumference of the disk substrate 5, and does not contact the outer circumference of the disk sheet layer 4. As a result, such problems that the disk sheet layer 4 is separated from the disk substrate 5, or the disk sheet 6 separated from the adjacent disk sheet 6, thereby providing a highly reliable optical disk 1.

[Sixth Example Structure of Optical Disk]

According to the optical disk 1 shown in FIG. 16 and FIG. 17, explanations have been given through the case where inner diameters or outer diameters of respective disk sheets 6 laminated on the disk substrate 5 are set all equal. With this structure, however, the level difference at the inner circumferential ends or outer circumferential ends between the disk substrate 5 and the disk sheets 6 laminated on the disk substrate 5. Therefore, in such event that the optical disk is accidentally dropped, and a collision of unspecified substances occurs at the vertical level difference, the unspecified substances would be caught by the vertical level difference, which would cause a separation of the disk sheet layer 4 from the disk substrate 5, and from the adjacent disk sheet 6.

Figure 18:
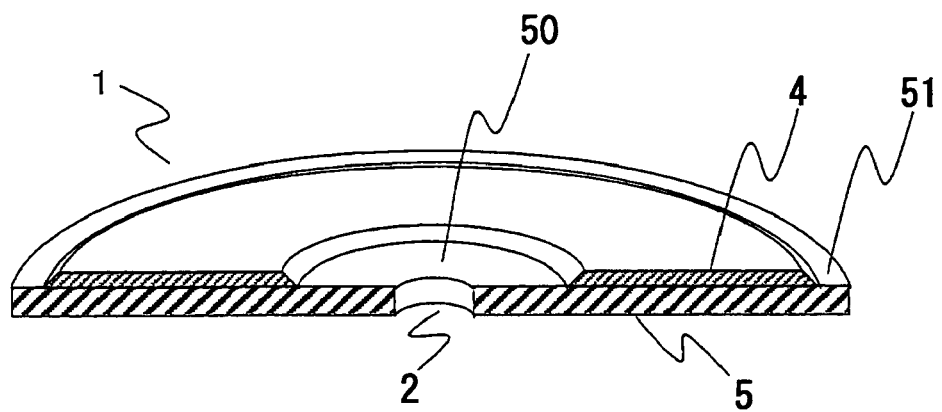
FIG. 18 is a perspective view which explains the structure of another optical disk in accordance with the present invention.
Figure 19:
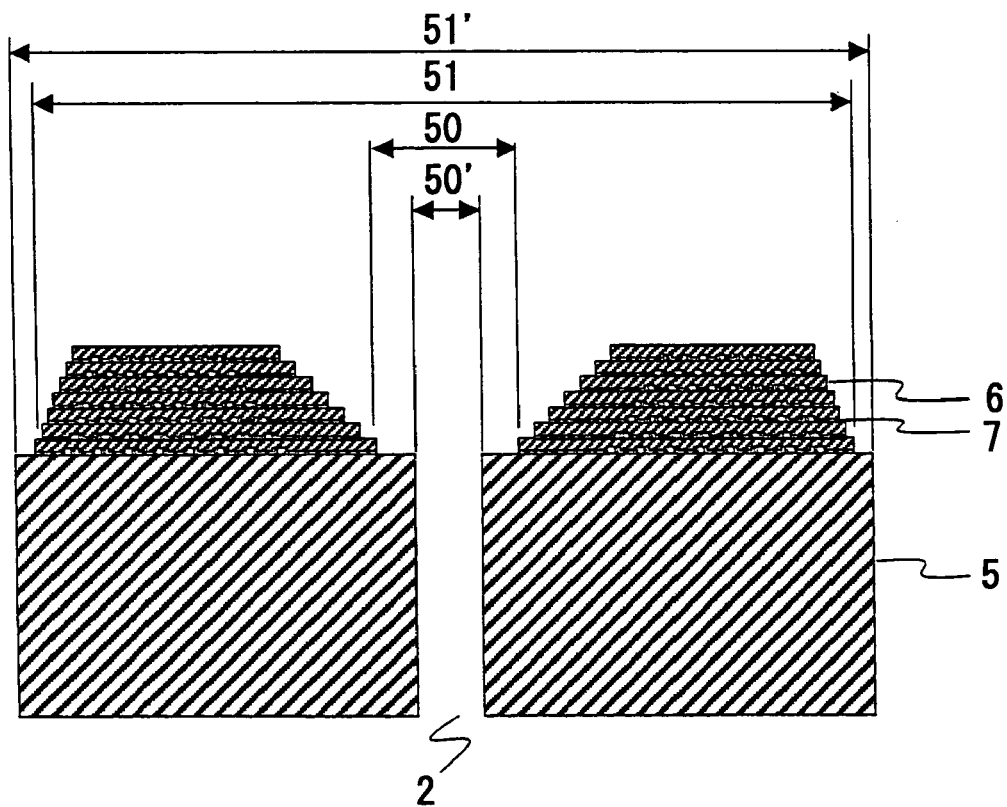
FIG. 19 is a cross-sectional view which explains the structure of the optical disk.

FIGS. 18 and 19 respectively show a perspective cross-sectional view and an enlarged cross-sectional view of the optical disk which permits the disk sheet layer 4 to be separated from the disk substrate 5 or from the adjacent disk sheet 6 can be suppressed.

As illustrated in FIG. 19, the plurality of disk sheets 6 of the disk sheet layer 4 are laminated in such a manner that the further from the disk substrate 5 in a laminating direction, the larger is the inner diameter of the disk sheet 6. With this structure, a vertical level difference as generated in the earlier explained examples would not occur, and the inner circumferential end of the disk sheet layer 4 forms a smooth slope. With this structure, the foregoing problem of the unspecified substances being caught which in turn causes the problem of a separation of the disk sheet layer 4 from the disk substrate 5, and from the adjacent disk sheet 6 can be suppressed. As a result, a highly reliable optical disk can be realized.

Specifically, with the structure wherein the inner diameters of the disk layers 6 of the disk sheet layer 4 are set equal irrespectively of the distance from the disk substrate 5, the vertical level difference at the inner circumferential ends of the disk sheets 6 would be large. For example, when ten disk sheets 6, each having a thickness of 39 μm are laminated, and an adhesive agent layer is formed between adjacent disk sheets 6 in a thickness of 1 μm, the vertical level difference at the inner circumferential ends would be 400 μm. Therefore, in such event that the optical disk is accidentally dropped, and a collision of unspecified substances occurs at the vertical level difference, which would cause a separation of the disk sheet layer 4 from the disk substrate 5, and from the adjacent disk sheet 6. In contrast, according to the structure of the present invention wherein the plurality of disk sheets 6 of the disk sheet layer 4 are laminated in such a manner that the further from the disk substrate 5 in a laminating direction, the larger is the diameter of the disk sheet 6, a vertical level difference as generated in the earlier explained examples would not occur, and the inner circumferential end of the disk sheet layer 4 forms a smooth slope. With this structure, the foregoing problem of the unspecified substances being caught which in turn causes the problem of a separation of the disk sheet layer 4 from the disk substrate 5, and from the adjacent disk sheet 6 can be suppressed. As a result, a highly reliable optical disk can be realized.

As illustrated in FIG. 19, the optical disk 1 in accordance with the present example is also arranged such that the plurality of disk sheets 6 of the disk sheet layer 4 are laminated in such a manner that the further from the disk substrate 5 in a laminating direction, the smaller is the outer diameter of the disk sheet 6.

As illustrated in FIG. 19, the plurality of disk sheets 6 of the disk sheet layer 4 are laminated in such a manner that the further from the disk substrate 5 in a laminating direction, the larger is the inner diameter of the disk sheet 6. With this structure, a vertical level difference as generated in the earlier explained examples would not occur, and the outer circumferential end of the disk sheet layer 4 forms a smooth slope. With this structure, the foregoing problem of the unspecified substances being caught which in turn causes the problem of a separation of the disk sheet layer 4 from the disk substrate 5, and from the adjacent disk sheet 6 can be suppressed. As a result, a highly reliable optical disk can be realized.

In the case where the outer diameter of the disk sheet layer 4 is set equal irrespectively of the distance from the disk substrate 5, the vertical level difference at the outer circumferential ends of the disk sheets 6 would be large. Therefore, in such event that the optical disk 1 is accidentally dropped, and a collision of unspecified substances occurs at the vertical level difference, the unspecified substances would be caught by the vertical level difference, which would cause a separation of the disk sheet layer 4 from the disk substrate 5, and from the adjacent disk sheet 6. In contrast, according to the structure of the present invention wherein the plurality of disk sheets 6 of the disk sheet layer 4 are laminated in such a manner that the further from the disk substrate 5 in a laminating direction, the larger is the diameter of the disk sheet 6, a vertical level difference as generated in the earlier explained examples would not occur, and the inner circumferential end of the disk sheet layer 4 forms a smooth slope. With this structure, the foregoing problem of the unspecified substances being caught which in turn causes the problem of a separation of the disk sheet layer 4 from the disk substrate 5, and from the adjacent disk sheet 6 can be suppressed. As a result, a highly reliable optical disk can be realized.

Figure 20:
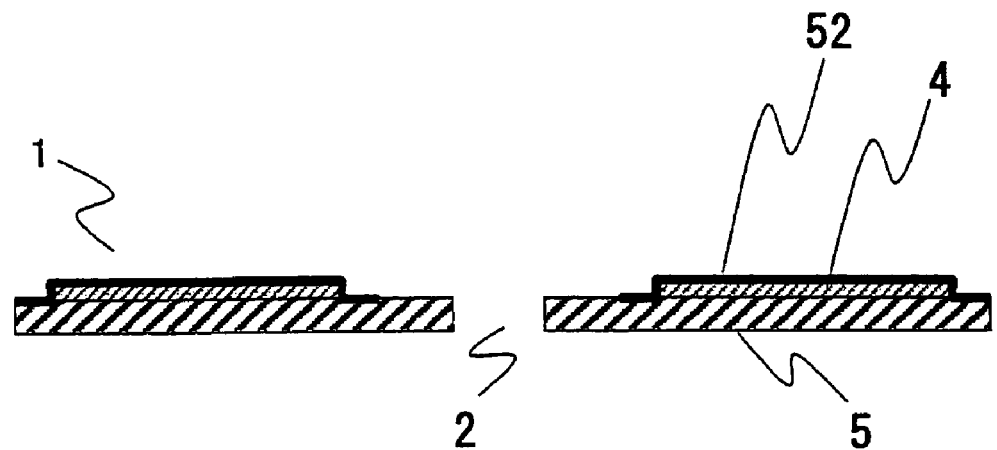
FIG. 20 is a cross-section view which explains still another structure of the optical disk of the present invention.
Figure 21:
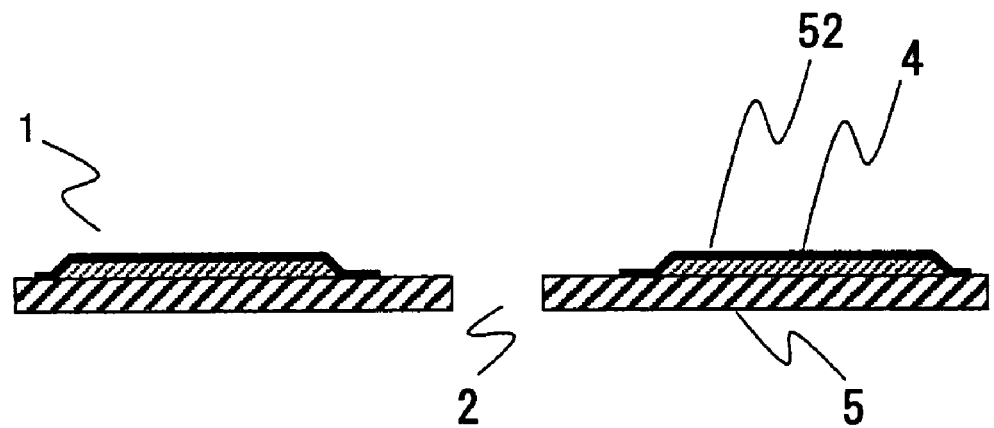
FIG. 21 is a cross-section view which explains still another structure of the optical disk of the present invention.

FIG. 20 shows the structure of the optical disk 1 shown in FIG. 16 wherein a protective film 52 is formed on the surface of the optical disk 1 so as to cover the inner circumferential ends or the outer circumferential ends in the disk diameter of the disk sheet layer 4. FIG. 21 shows the structure of the optical disk 1 shown in FIG. 18 wherein a protective film 52 is formed on the surface of the optical disk 1 so as to cover the inner circumferential ends or the outer circumferential ends in the disk diameter of the disk sheet layer 4. The protective film 52 of this example is formed so as to cover both the inner circumferential ends and the outer circumferential ends of the disk sheets of the disk sheet layer; however, the protective film 52 is not necessarily be formed so as to cover both as long as it covers at least the inner circumferential ends or the outer circumferential ends.

According to the foregoing structure, at least the inner circumferential ends or the outer circumferential ends of the disk sheet layer 4 are completely covered with the protective film 52. Therefore, in such event that the optical disk is accidentally dropped, and a collision of unspecified substances occurs at the inner circumferential end or the outer circumferential end of the disk sheet layer 4, the unspecified substances would hit the protective film 52, and thus would not cause a separation of the disk sheet layer 4 from the disk substrate 5, and from the adjacent disk sheet 6. As a result, the problem of the unspecified substances being caught which in turn causes the problem of a separation of the disk sheet layer 4 from the disk substrate 5, and from the adjacent disk sheet 6 can be surely prevented, thereby realizing a more highly reliable optical disk 1.

The foregoing protective film 52 may be formed so as to cover the inner circumferential end or the outer circumferential end of the disk sheet layer 4 when forming the protective layer 20 shown in FIG. 7. The protectively layer 52 may be formed so as to cover the inner circumferential end or the outer circumferential end of the disk sheet layer 4 when forming the protective layer 22 shown in FIG. 8. Namely, the protective layer 20 shown in FIG. 7 or the protective sheet 22 shown in FIG. 8 may be formed so as to cover not only the top most surface of the disk sheet 6 but also the inner circumferential ends or the outer circumferential ends.

Figure 22:
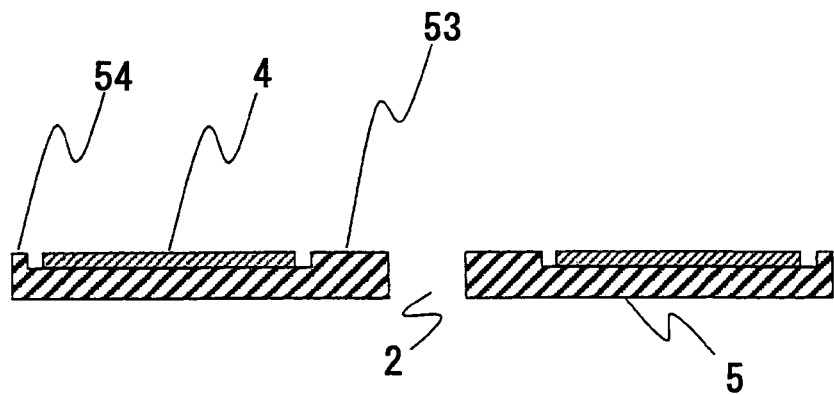
FIG. 22 is a cross-section view which explains still another structure of the optical disk of the present invention.

Next, FIG. 22 is a cross-sectional view of a multi-layered optical disk wherein the thickness of the inner circumferential region 53 (second region) and the outer circumferential region 54 (second region) of the disk substrate 5 is formed thicker than the region where the disk sheet layer 4 is laminated (first region).

Here, the inner circumferential region 53 is defined to be a region in the inside of the predetermined first radius on the disk substrate 5, and the outer circumferential region 54 is defined to be a region in the outside of the second radius which is set larger than the first radius on the disk substrate 5. The disk sheet layer 4 is formed in the region outside the inner circumferential region 53 and the outer circumferential region 54, i.e., in the outside of the first radius and in the inside of the second radius.

As illustrated in FIG. 22, the disk sheet layer 4 is formed in the disk substrate 5, so as to be protective by the inner circumferential region 53 and the outer circumferential region 54 of the disk substrate 5, which are formed thicker. Incidentally, the effect of protecting the disk sheet layer 4 can be achieved also from the structure wherein only the inner circumferential region in the inside of the predetermined radius of the disk substrate 5 is formed thicker or only the outer circumferential region in the outside of the predetermined radius of the disk substrate 5 is formed thicker.

As described, the disk sheet layer 6 can be prevented from being separated from the disk substrate 5 or from the adjacent disk sheet layer 6, and it is therefore possible to still increase the mechanical strength of the optical disk. For example, when fifteen disk sheets 6, each having a thickness of 39 μm are laminated, and an adhesive agent layer is formed between adjacent disk sheets 6 in a thickness of 1 μm, an overall thickness of the disk sheets 6 to be laminated on the disk substrate 5 would be 600 μm. In consideration of the convertibility with a conventional optical disk (thickness of 1.2 mm), it is desirable that the thickness of the disk substrate 5 be set to 600 μm. However, a reduction in thickness of the optical disk 5 would reduce the mechanical strength of the optical disk.

Incidentally, for example, when the outer circumferential end of the disk substrate 5 having a thickness of 600 μm has an impact as being dropped, for example, the outer circumferential end of the disk substrate 5 would be damaged with ease. Incidentally, by fixing and holding the inner circumferential end (central hole) of the disk substrate 5, by repeating the installation of the optical disk in a recording/reproducing device, the inner circumferential end of the disk substrate 5 would be gradually deformed or damaged.

Therefore, in such event that the optical disk is accidentally dropped, and a collision of unspecified substances occurs at the vertical level difference, the unspecified substances would be caught by the vertical level difference, which would cause a separation of the disk sheet layer 4 from the disk substrate 5, and from the adjacent disk sheet 6. In contrast, according to the structure of the present invention wherein the plurality of disk sheets 6 of the disk sheet layer 4 are laminated in such a manner that the further from the disk substrate 5 in a laminating direction, the larger is the diameter of the disk sheet 6, a vertical level difference as generated in the earlier explained examples would not occur, and the inner circumferential end of the disk sheet layer 4 forms a smooth slope. With this structure, the foregoing problem of the unspecified substances being caught which in turn causes the problem of a separation of the disk sheet layer 4 from the disk substrate 5, and from the adjacent disk sheet 6 can be suppressed. As a result, a highly reliable optical disk can be realized.

By setting at least one of the inner circumferential region 53, the outer circumferential region 54 thicker than the thickness of the region where the disk sheets 6 (disk sheet layer 4) are formed, it is possible to increase the mechanical strength of at least one of the inner circumferential region 53 and the outer circumferential region 54, which is/are formed thicker, thereby suppressing a possible damage on the disk substrate 5 as being accidentally dropped, or repetitively installed in a recording/reproducing device.

By forming the inner circumferential region 53 and the outer circumferential region 54 of the disk substrate 5 thicker, it is possible to suppress a damage on the disk substrate 5 when being accidentally dropped or repetitively installed in a recording/reproducing device.

Figure 23:
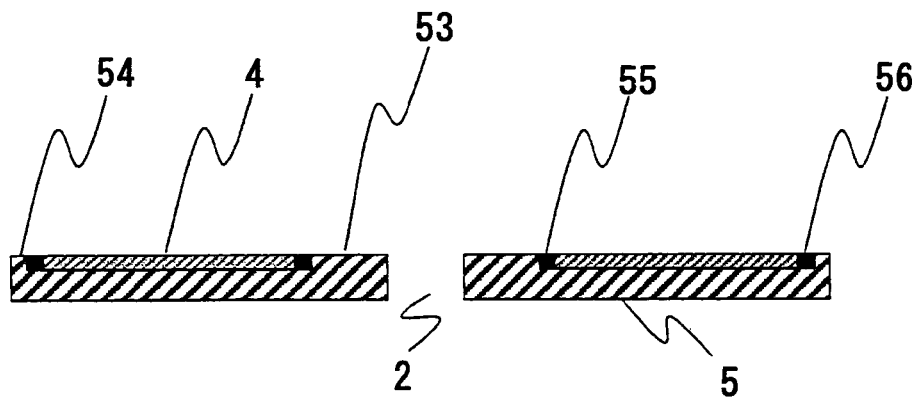
FIG. 23 is a cross-section view which explains still another structure of the optical disk of the present invention.

Next, FIG. 23 shows a cross-sectional view of a multi-layered optical disk having the structure in which the adhesive agent is filled in the spacing 55 between the inner circumferential region 53 and the disk sheet layer 4, and in the spacing 56 between the outer circumferential region 54 and the disk sheet layer 4.

In the multi-layered optical disk shown in FIG. 23, a bonding agent is filled in the spacing 55 with the inner circumferential region 53 and in the spacing 56 with the outer circumferential region 54, the respective sides of the disk sheet layer 4 are completely fixed to the disk substrate 5. Therefore, as compared to the multi-layered optical disk shown in FIG. 22, the mechanical strength becomes still higher, and the separation of the disk sheet layer 4 from the disk substrate 5 and from an adjacent disk sheet 6 can be still suppressed. By setting at least one of the inner circumferential region 53, the outer circumferential region 54 thicker than the thickness of the region where the disk sheets 6 (disk sheet layer 4) are formed, it is possible to increase the mechanical strength of at least one of the inner circumferential region 53 and the outer circumferential region 54, which is/are formed thicker. Further, by filling with the bonding agent, the spacing 55 between the inner circumferential region 53 and the disk sheet layer 4, or the spacing 56 between the outer circumferential region 54 and the disk sheet layer 4, or both in the spacing 55 and the spacing 56, it is possible to make the optical disk thinner, thereby realizing an optical disk of a mechanical strength.

By forming the inner circumferential region 53 and the outer circumferential region 54 of the disk substrate 5 thicker, it is possible to suppress a damage on the disk substrate 5 when being accidentally dropped or repetitively installed in a recording/reproducing device.

Next, FIG. 23 shows a cross-sectional view of a multi-layered optical disk having the structure in which the adhesive agent is filled in the spacing 55 between the inner circumferential region 53 and the disk sheet layer 4, and in the spacing 56 between the outer circumferential region 54 and the disk sheet layer 4. Further, the respective ends of the disk sheet layer 4 are completely fixed to the disk substrate 5 by the bonding agent thus filled, and it is therefore possible to further suppress the separation of the disk sheet layer 4 from the disk substrate 5 and from the adjacent disk sheet 6.

According to the foregoing optical disk, the disk sheet layer 4 is formed on the disk substrate 5 in such a manner that the recording face 6a and the back surface 6b of the adjacent disk sheets 6 face each other, to have a uniform interval between the adjacent recording faces 6a. Therefore, for an optical disk device for recording or reproducing on or from the foregoing optical disk, it is possible to project a light beam with small coma aberration, spherical aberration, etc., to be focused on the recording face, thereby realizing an optical disk recording device or reproducing device which permits desirable recording/reproducing characteristics to be realized.

Furthermore, according to the foregoing optical disk, the interval between recording faces 6a of the adjacent disk sheets 6 can be made uniform, and when a focused light beam on one recording face 6a is moved to another recording face 6b, it is possible to accurately predict the distance to the target recording face 6a. Further, it is possible to make an interlayer access jump based on the distance to the target recording face 6a as predicted.

Furthermore, by increasing the mechanical strength of the optical disk, the side-runout of the optical disk when recording/reproducing can be suppressed, thereby providing an optical recording/reproducing device which realizes desirable recording/reproducing characteristics.

EMBODIMENTS

First Embodiments

In the present embodiment, the method of manufacturing an optical disk of quadri-layered structure of the ROM system will be explained.

According to the method of forming a disk sheet shown in FIG. 12, a band-shaped disk sheet 29 having a recording face 6a with bits 8 in recessed form will be explained.

For the band-shaped disk sheet 29, a polycarbonate film with a thickness of around 30 μm is formed. In the method of forming the disk sheet shown in FIG. 12, the band-shaped disk sheet 29 is provided between the first rotation roller 36 and the second rotation roller 35 with the stamper 30, and as being depressed with a pressure of 6 MPa, a bit pattern can be copied to the surface of the stamper 30. Here, the bit pattern is copied in the state where the first rotation roller 36 and the second rotation roller 35 with the stamper 30 are heated to 130° C. beforehand. With respect to eight kinds of stampers 30 with the bit pattern in which different kinds of information is recorded, four kinds of band-shaped disk sheets are formed corresponding to the respective stampers 30.

Next, according to the film forming method shown in FIG. 14, a reflective film 10 made of AlTi alloy is formed on the recording face of each of the four kinds of band shaped disk sheets 29. The film thickness of the reflective film of each band-shaped disk sheet 29 is determined so as to obtain substantially equal intensity of the light reflected from each layer. Namely, the film thickness of each reflective film is adjusted so as to have the indexes of reflectance of the layers of 15%, 24%, 42% and 94% respectively in this order from the light incident side. With this structure, when laminating the band-shaped disk sheet 29, the intensity of the light reflected from each layer can be made substantially equal, i.e., 15%.

Next, on the disk substrate 5 in 1.0 mm thickness made up of polycarbonate resin, four kinds of band-shaped disk sheets 29 are laminated using the adhesive agent layer 7 made of acrylic ultraviolet ray curing resin. The disk sheets 29 thus laminated are then cut in a disk shape. Here, the disk sheets 6 are laminated so that the recording face 6a of each disk sheet 6 faces the side of the disk substrate 5 (see FIG. 5). Here, the thickness of the adhesive agent layer 7 made of ultraviolet ray curing resin is set to 1 μm.

The quadri-layered optical disk thus formed in the foregoing method is set in the optical disk reproducing device shown in FIG. 6. Then, the light beam is projected so as to be focused on each recording face 6a to reproduce information recorded in the bit pattern. As a result, the bit error rate (BER: Bit Error Rate) of $1\times10^{-4}$ is obtained at the recording face 6a on the light incident side, and the bit error rate (BER: Bit Error Rate) of $1\times10^{-5}$ to $2\times10^{-5}$ can be obtained at each of other recording faces 6a. Namely, the bit error rate in the practical level can be obtained in any of the recording faces 6a of these four disk sheets 6.

Second Embodiment

In the present embodiment, a protective layer 20 made of ultraviolet ray curing resin is formed on an optical disk in the quadri-layer structure of the ROM system (see FIG. 7).

Specifically, after spin-coating the surface of the upper most disk sheet 6 with the acrylic series ultraviolet ray curing resin, an ultraviolet ray is projected, to form the protective layer 20 made of ultraviolet ray curing resin layer formed in the thickness of 30 μm.

With respect to the foregoing quadri-layered optical disk having formed thereon the protective layer 20, information is reproduced in the same manner as the first embodiment. As a result, it can be confirmed that all the recording faces 6a show the bit error rate (BER: Bit Error Rate) in a range of $4\times10^{-5}$ to $7\times10^{-5}$. The reason why desirable effect can be achieved from the structure of the present invention is that the light beam is incident on the surface of the protective layer 20, and the light beam spot on the light incident surface becomes enlarged, whereby an occurrence of an error due to the scratch or dust particles on the light incident surface can be suppressed.

Third Embodiment

In the present embodiment, a protective layer 22 made of polycarbonate resin is formed on the optical disk of the quadri-layer structure of the ROM system (see FIG. 7) in accordance with the first embodiment.

Specifically, on the surface of the upper most disk sheet 6, using the adhesive agent layer 21 made of acrylic series ultraviolet ray curing resin, the protective layer 22 made of polycarbonate resin is formed in the thickness of 30 μm.

With respect to the foregoing quadri-layered optical disk having formed thereon the protective layer 20, information is reproduced in the same manner as the first embodiment. As a result, it can be confirmed that all the recording faces 6a show the bit error rate (BER: Bit Error Rate) in a range of $1\times10^{-5}$ to $2\times10^{-5}$. The reason why desirable effect can be achieved from the structure of the present embodiment is that the light beam is incident on the surface of the protective layer 22, and the light beam spot on the light incident surface becomes enlarged, whereby an occurrence of an error due to the scratch or dust particles on the light incident surface can be suppressed.

In the second embodiment, the BER of the recording face 6a on the side of the light incident surface is improved; however, the BER at other recording faces 6a are deteriorated. This is because due to variations in the shape of the focused beam spot, an occurrence of the error is increased.

In contrast, according to the present embodiment (third embodiment), the thickness of the protective sheet 22 becomes uniform, which suppresses an occurrence of the focused beam spot, and a desirable BER can be realized at all the recording faces 6a.

Fourth Embodiment

In the present embodiment, adopted is the optical disk of the quadri-layer structure of the ROM system having the same structure as the first embodiment, except that the upper most disk sheet 6 is made thicker (see FIG. 9).

Specifically, only the upper most disk sheet 6 is formed in the thickness of 60 μm, and other disk sheets 6 are formed in the thickness of 30 μm.

With respect to the foregoing quadri-layered optical disk having formed thereon the protective layer 20, information is reproduced in the same manner as the first embodiment. As a result, it can be confirmed that all the recording faces 6a show the bit error rate (BER: Bit Error Rate) in a range of $1\times10^{-5}$ to $2\times10^{-5}$. The reason why desirable effect can be achieved from the structure of the present embodiment is that by adopting the thicker disk sheet 6 for the upper most disk sheet 6, as compared to the case where the disk sheet 6 is selected to be in the same thickness as other disk sheets 6, the light beam spot on the light incident surface can be made larger, whereby an occurrence of an error due to the scratch or dust particles on the light incident surface can be suppressed.

According to the present embodiment, the thickness of the protective sheet 22 is made uniform, thereby achieving the effects of suppressing an occurrence of the focused beam spot, and achieving a desirable BER at all the recording faces 6a.

Fifth Embodiment

In the present embodiment, adopted is an optical disk in the quadri-layer structure of the ROM system (see FIG. 10) having the same structure as that of the second embodiment except that disk sheets 6 are laminated in the reversed order (the back surface 6b of each disk sheet 6 is positioned on the side of the disk substrate 5).

As in the case of the second embodiment, the protective layer 23 made of ultraviolet ray curing resin layer is formed on the upper most disk sheet 6 so as to cover its recording face 6a. The optical disk in accordance with the present embodiment is further arranged to form the protective layer 23 thicker, specifically, in the thickness of 60 μm to ensure a large interval between the light incident surface and the recording face 6a of the upper most disk sheet 6, and to suppress an occurrence of an error due to the scratch or dust particles on the light incident surface.

With respect to the foregoing quadri-layered optical disk, information is reproduced in the same manner as the second embodiment. As a result, it can be confirmed that all the recording faces 6a show the bit error rate (BER: Bit Error Rate) in a range of $4\times10^{-5}$ to $7\times10^{-5}$.

Sixth Embodiment

In the present embodiment, adopted is an optical disk in the quadri-layer structure of the ROM system (see FIG. 11) having the same structure as that of the third embodiment except that disk sheets 6 are laminated in the reversed order (the back surface 6b of each disk sheet 6 is positioned on the side of the disk substrate 5).

As in the case of the third embodiment, a protective sheet 25 made of polycarbonate resin is formed on the upper most disk sheet 6 so as to cover its recording face 6a using the adhesive agent 24 made of acrylic series ultraviolet ray curing resin. Here, the adhesive agent layer 24 is formed in 1 μm to suppress variations in its thickness, and the protective sheet 25 is formed in 60 μm to ensure a large interval between the light incident surface and the recording face 6a of the upper most disk sheet 6, and to suppress an occurrence of an error due to the scratch or dust particles on the light incident surface.

With respect to the foregoing quadri-layered optical disk, information is reproduced in the same manner as the third embodiment. As a result, it can be confirmed that all the recording faces 6a show the bit error rate (BER: Bit Error Rate) in a range of $1\times10^{-5}$ to $2\times10^{-5}$ as in the case of the third embodiment.

Seventh Embodiment

In the present embodiment, formed is an optical disk 1 shown in FIG. 16 and FIG. 17.

The disk sheet 6 includes a disk substrate made of polycarbonate film in the thickness of 30 μm and an ultraviolet ray curing resin layer formed thereon in a thickness of 3 μm, and on the surface of the ultraviolet ray curing resin, pits 8 with a depth of 20 nm and width 0.3 μm are formed in a spiral form at pitches of 0.5 μm.

Here, using four kinds of original plates with pit pattern in which different kinds of information is recorded, four kinds of sheets 6 corresponding to the original plates are formed.

Next, for each of these four kinds of disk sheets 7, a reflective film made of AlTi alloy is formed on the recording face 6a, and after forming the disk sheet 6 in a shape of a disk, four kinds of disk sheets 6 are laminated using the adhesive agent 7 made of acrylic series ultraviolet ray curing resin on the disk substrate made of polycarbonate resin in the thickness of 1.0 mm.

Here, the disk substrate 5 is formed to have an inner diameter 50' of 15 mmϕ, and an outer diameter of 51' of 120 mmϕ, and the disk sheets 6 are all have the inner diameter 50 of 25 mm and an outer diameter 51 of 115 mmϕ. The respective disk sheets 6 are formed as shown in FIG. 5, i.e., the recording face 6a of each disk sheet 6 is formed on the side of the disk substrate 5, thereby forming the quadri-layered optical disk of the ROM system in which four disk sheets 6 are formed on the disk substrate 5.

The quadri-layered optical disk formed in the foregoing method is set in the optical disk reproducing device shown in FIG. 6, and the light beam 13 is projected from the side of the disk sheet 6, so that the light beam 13 is focused onto the recording face 6*a* to reproduce information recorded in the bit pattern of protrusions and recessions. As a result, the recording face 6*a* on the light incident side shows the bit error rate of $1.5 \times 10^{-4}$, and the bit error rate (BER: Bit Error Rate) of $1 \times 10^{-5}$ to $2 \times 10^{-5}$ can be obtained at each of other recording faces 6*a*. Namely, the bit error rate in the practical level can be obtained in any of the recording faces 6*a* of these four disk sheets 6.

Incidentally, the quadri-layered optical disk in which the inner diameter is set equal to the outer diameter of the disk substrate 5 and the disk sheet layer 6 is formed as a comparative example of the present embodiment, and installation and removal of the quadri-layered optical disk in accordance with the present embodiment and the quadri-layered optical disk of the comparative example are repeated in and from a CD disk case available in the market. Here, the CD disk case has inner circumferential protrusion corresponding to the central hole 2 of the disk substrate 2, so as to be mechanically depressed and supported.

After repeating the installation and removal of the optical disk 100 times, the respective states of the disk substrate 5 and the disk sheet layer 4 and adjacent disk sheets 6 are checked. As a result, as to the quadri-layered optical disk in accordance with the seventh embodiment, the disk sheet layer 4 can be prevented from being separated from the disk substrate 5, or from the adjacent disk sheet 6. In contrast, as to the quadri-layered optical disk in accordance with the comparative example, the disk sheet layer 4 is separated both from the disk substrate 5 and from the adjacent disk sheet 6 at both inner circumferential end and the outer circumferential end.

For the comparative example, the separation of the disk sheet layer 4 occurs at the inner circumferential end because the inner circumferential protrusion of the CD disk case contacts the disk substrate 5 and the disk sheets 6. On the other hand, the separation of the disk sheet layer occurs at the outer circumferential end due to the handling when installing and removing the comparative optical disk.

On the other hand, in the seventh embodiment, the disk sheets 6 can be prevented from contacting other member when being installed and removed, which in turn prevents the disk sheet 6 from being separated from the disk substrate 5.

Eighth Embodiment

A multi-layered optical disk shown in FIG. 18 and FIG. 19 is formed as an optical disk in accordance with the present embodiment.

In the seventh embodiment, the disk sheets 6 all have an inner diameter 50 of 25 mm and an outer diameter 51 of 115 mm$\phi$. In the present embodiment, however, the disk sheet 6 formed next to the disk substrate 5 is set so as to have the inner diameters 50 of 25.5 mm$\phi$, and an outer diameter 51 of 114.5 mm$\phi$, and respective other disk sheets 6 formed on that disk sheet 6 are selected to have inner diameters of 26 mm$\phi$, 26 mm$\phi$, and 27 mm$\phi$, in this order, and the outer diameters of 114 mm$\phi$, 113.5 mm$\phi$, and 113 mm$\phi$ in this order. Namely, other disk sheets are formed so as to have a larger inner diameter than the adjacent disk sheet 6 by 0.5 mm, and a smaller outer diameter than the adjacent disk sheet 6 by 0.5 mm. Other than the size, the quadri-layered optical disk in accordance with the present embodiment is the same as that of the seventh embodiment.

Here, the quadri-optical disk in accordance with the eighth embodiment is arranged such that the further is the disk sheet 6 from the disk substrate, the larger is the inner diameter, and the smaller is the outer diameter. Therefore, as compared to the seventh embodiment, the level different at the inner and outer circumferential ends (edges) of the disk sheet layer 4 can be made smoother, and the edges can be prevented from being caught. As a result, the separation of the disk sheet 6 can be suppressed, thereby providing a highly reliable quadri-layered optical disk.

The quadri-layered optical disk formed in the foregoing method is set in the optical disk reproducing device shown in FIG. 6, and the light beam 13 is projected from the side of the disk sheet 6, so that the light beam 19 is focused onto the respective recording faces 10 to reproduce information recorded in the bit pattern of protrusions and recessions. As a result, the recording face 6*a* on the light incident side shows the bit error rate of $1.7 \times 10^{-4}$, and the bit error rate (BER: Bit Error Rate) of $1 \times 10^{-5}$ to $2 \times 10^{-5}$ can be obtained at each of other recording faces 6*a*. Namely, the bit error rate in the practical level can be obtained in any of the recording faces 6*a* of these four disk sheets 6.

Next, the quadri-layered optical disks in accordance with the seventh embodiment and the eighth embodiment are placed on the plate surface, and on the surface where the disk substrate 5 is exposed, a needle with a semicircular leading end (curvature radius of 0.06 mm) is depressed vertically with a fixed pressure, and in this state, the quadri-layered optical disk is moved in parallel to move the needle from the surface of the disk substrate 5 relatively in the direction of the disk sheet 6. Then, the differences between the quadri-layered optical disk in accordance with the seventh embodiment and the quadri-layered optical disk in accordance with the present embodiment are checked.

As a result, in the quadri-layered optical disk in accordance with the seventh embodiment which as a vertical level difference of substantially 0.13 mm at the edge portion of the disk sheet layer 4, and the needle with a semicircular leading end (curvature radius of 0.06 mm) is caught at the vertical level difference of the edge portion. As a result, the disk sheet layer 4 is separated from the disk substrate 5 and adjacent disk sheets 6 are separated at the edge portion as the quadri-layered optical disk is moved parallel. In contrast, the quadri-layered optical disk in accordance with the eighth embodiment, the edge portion of the disk sheet layer 4 is formed in the slope, and the edge portion of each disk sheet 6 has a level difference of substantially 0.033 mm, which is smaller than the curvature radius of 0.06 mm at the leading end of the needle. Therefore, the needle moves smoothly along the slope without being caught by the level difference of the disk sheet 6, and the separation of the disk sheet layer 4 from the disk substrate 5 or separation between the adjacent disk sheets 6 are not observed.

As described, according to the quadri-layered optical disk in accordance with the eighth embodiment, in such event of, for example, an accidental drop, etc., and the disk sheet edge portion is subjected to an impact, etc., as the vertical level difference is small at the disk sheet edge portion, such problem of the disk sheet 6 being caught by a hit substance and separated can be avoided.

Ninth Embodiment

Specifically, after spin-coating the surface of the upper most disk sheet 6 with the acrylic series ultraviolet ray curing resin, an ultraviolet ray is projected, to form the protective layer 20 made of ultraviolet ray curing resin layer formed in the thickness of 20 μm. As a result, the quadri-layered optical disk having the structure shown in FIG. 20 is formed. Here, the protective film 52 is formed at 23 mm$\phi$ to the outer circumferential end of the disk so as to cover the surface, and inner and outer circumferential ends of the disk sheet layer 4.

With respect to the foregoing quadri-layered optical disk having formed thereon the protective film 52, information is reproduced in the same manner as the seventh embodiment. As a result, it can be confirmed that all the recording faces 6a show the bit error rate (BER: Bit Error Rate) in a range of $4 \times 10^{-5}$ to $7 \times 10^{-5}$. The reason why desirable effect can be achieved from the structure of the present invention is that the light beam is incident on the surface of the protective film 52, and the light beam spot on the light incident surface becomes enlarged, whereby an occurrence of an error due to the scratch or dust particles on the light incident surface can be suppressed.

The quadri-layered optical disk in accordance with the seventh embodiment, and the quadri-layered optical disk in accordance with the ninth embodiment are placed on the plane, and a steel ball with a diameter of 1 cm is dropped onto the inner circumferential ends of these disks at the height of 50 cm, and the disk sheet separation test is performed against an impact. In the quadri-layered optical disk in accordance with the seventh embodiment, after the steel ball is dropped ten times, the disk sheet layer 4 is separated from the disk substrate 5, and the adjacent disk sheets 6 are separated. In contrast, as to the quadri-layered optical disk with the protective sheet 52 in accordance with the ninth embodiment, only a fine separation is observed after the steel ball is dropped 55 times. It is therefore confirmed that the protective film 52 can prevent the separation of the disk sheet layer 4 from the disk substrate 5, and the separation of the adjacent disk sheets 6.

Incidentally, the same effects as achieved from the present embodiment can be achieved also when adopting the protective sheet as the protective film 52.

Tenth Embodiment

With respect to the quadri-layered optical disk in accordance with the eighth embodiment, a protective sheet 52 made of polycarbonate resin is formed in the thickness of 30 μm is laminated on the surface of the upper most disk sheet 6 using an adhesive agent made of acrylic ultraviolet ray curing resin. As a result, the quadri-layered optical disk having the structure shown in FIG. 21 is formed.

With respect to the foregoing quadri-layered optical disk having formed thereon the protective sheet 52, information is reproduced in the same manner as the seventh embodiment. As a result, it can be confirmed that all the recording faces 6a show the bit error rate (BER: Bit Error Rate) in a range of $1 \times 10^{-5}$ to $3 \times 10^{-5}$. The reason why desirable effect can be achieved from the structure of the present invention is that the light beam is incident on the surface of the protective film 52, and the light beam spot on the light incident surface becomes enlarged, whereby an occurrence of an error due to the scratch or dust particles on the light incident surface can be suppressed.

The quadri-layered optical disk in accordance with the eighth embodiment, and the quadri-layered optical disk in accordance with the tenth embodiment are placed on the plane, and a steel ball with a diameter of 1 cm is dropped onto the inner circumferential ends of these disks respectively at the height of 50 cm, and the disk sheet separation test is performed against an impact. In the quadri-layered optical disk in accordance with the eighth embodiment, after the steel ball is dropped twenty times, the disk sheet layer 4 is separated from the disk substrate 5, and the adjacent disk sheets 6 are separated. In contrast, as to the quadri-layered optical disk with the protective sheet 52 in accordance with the ninth embodiment, only a fine separation is observed after the steel ball is dropped 150 times. It is therefore confirmed that the protective sheet 52 can prevent the separation of the disk sheet layer 4 from the disk substrate 5, and the separation of the adjacent disk sheets 6.

Incidentally, the same effects as achieved from the present embodiment can be achieved also when adopting the protective sheet as the protective film 52.

Eleventh Embodiment

Figure 24:
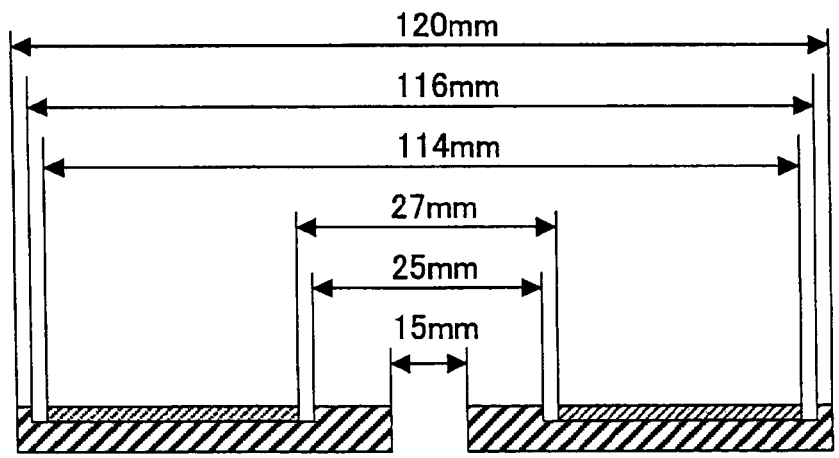
FIG. 24 is a cross-sectional view which explains one example of the optical disk.

As a multi-layered optical disk in accordance with the eighth embodiment, prepared is an optical disk having the structure shown in FIG. 24. In the present embodiment, the disk substrate 5 made of polycarbonate is prepared such that the inner circumferential region with a width of 5 mm and the outer circumferential region with a width of 2 mm are formed thicker than the region where the disk sheets 6 are formed. Specifically, the inner circumferential region and the outer circumferential region are formed in the thickness of 1.15 mm, and the region where the disk sheet 6 is formed is formed in the thickness of 1.0 mm.

The fourth kinds of the disk sheets 6 formed in the same manner as the seventh embodiment respectively have the inner diameter of 27 mmφ and an outer diameter of 114 mmφ, and the disk sheets 6 are laminated on the thinner region of the disk substrate 5 using the adhesive agent 7 made of acrylic ultraviolet ray curing resin.

Then, the recording/reproducing characteristics of the quadri-layered optical disk in the present embodiment are tested. As a result, desirable recording/reproducing characteristics are obtained as in the case of the seventh embodiment. Another test is performed by repeating the installation and removal of the quadri layered optical disk in accordance with the present embodiment with respect to the CD disk case in the same manner as the seventh embodiment. As a result, the separation of the disk sheet layer 4 from the disk substrate 5 and the separation of the disk sheets 6 are not observed, and it is confirmed that the separation of the disk sheet layer 4 from the disk substrate 5 and the separation of the adjacent disk sheets 6 can be prevented also in the optical disk of the multi-layered structure.

Twelfth Embodiment

In the present embodiment, as illustrated in FIG. 23, acrylic ultraviolet ray curing resin is applied in the spacing between the inner circumferential region and the outer circumferential region of the disk sheet layer 4 and the disk substrate 5 in the quadri-layered optical disk in accordance with the eleventh embodiment. Thereafter, the ultraviolet ray is projected to cure the acrylic ultraviolet ray curing resin to prepare an optical disk.

With respect to the quadri-layered optical disk in accordance with the eleventh embodiment and the twelfth embodiment, a test is performed by dropping the steel ball in the same manner as the ninth embodiment. In the quadri-layered optical disk in accordance with the eleventh embodiment, after the steel ball is dropped fifteen times, the disk sheet layer 4 is separated from the disk substrate 5, and the adjacent disk sheets 6 are separated. In contrast, as to the quadri-layered optical disk in accordance with the twelfth embodiment, the separation of the disk sheet layer 4 from the disk substrate 5, and separation of the adjacent optical disks are not observed even after the steel ball is dropped 150 times. It is therefore confirmed that the protective sheet 52 can prevent the separation of the disk sheet layer 4 from the disk substrate 5, and the separation of the adjacent disk sheets 6.

As can be seen from the foregoing test results, it is confirmed that by filing the space between the disk substrate 5 and the disk sheet layer 4, it is possible to still suppress the separation of the disk sheet layer 4 from the disk substrate 5 and the separation of adjacent disk sheets 6.

Furthermore, by forming the protective layer 52 or the protective sheet 52 on the multi-layered optical disk in accordance with the eleventh embodiment and the twelfth embodiment, it is possible to improve the recording/reproducing characteristic, and to still suppress the separation of the disk sheets 6.

As described, the optical disk in accordance with the present embodiment is characterized by including a plurality of disk sheets which are laminated, each of which has a recording face on one of the surfaces.

Here, the recording face indicates the surface of the optical disk whereon information is recorded.

With this structure, as compared to the conventional optical disk formed by hardening the ultraviolet ray curing resin on a substrate in sequence, a shrinkage is not liable to occur in the process of forming recording faces, and thus the disk can be maintained flat. Furthermore, as a disk sheet of a uniform thickness without a partial distortion can be selected as a disk sheet to be laminated, an interval between recording faces of the adjacent disk sheets can be maintained constant.

In the optical disk, when recording or reproducing, the problem of generating coma aberration or spherical aberration of the light beam can be suppressed, thereby realizing desirable recording/reproducing characteristics.

With the foregoing structure, it is preferable that a plurality of disk sheets be laminated in such a manner that between adjacent two disk sheets, the back surface of one of the disk sheets, on the opposite side of the surface where the recording face is formed, faces the disk surface of the other disk sheet.

According to the above structure, it is possible to more surely maintain an interval between adjacent recording faces constant.

It is also preferable that the back surface be formed in the plane surface.

In this case, when bonding the adjacent disk sheets, as one of the bonded faces (bonding surface) is flat, it is possible to simplify the bonding process.

In the foregoing structure, it is preferable that the bonding layer made of ultraviolet ray curing resin be formed between the disk substrate and the disk sheet and between adjacent disk sheets.

By adopting the ultraviolet ray curing resin for the material of the adhesive layer, it is possible to reduce the time required for forming the adhesive layer. In the foregoing structure, it is preferable that the disk sheet be formed thinner than the disk substrate.

In this case, by laminating a plurality of relatively thin disk sheets, it is possible to realize the optical disk of a large capacity, and to improve the mechanical strength of the optical disk.

It is also preferable that a protective layer be formed so as to cover the disk sheet laminated at position most apart from the disk substrate.

By forming the protective layer, the disk sheet (its recording face, in particular) can be protected, and the disk sheet (its recording face, in particular) can be prevented from being scratched as being hit against an external section.

When recording/reproducing by projecting the light beam from the side of the upper most disk sheet, the distance between the surface of the optical disk and the recording face (the recording face formed close to the disk surface, in particular) can be increased, and it is therefore possible to increase the ratio of the spot diameter on the surface of the optical disk with respect to the sport diameter of the recording face. With this structure, when carrying out the recording or reproducing operation, it is therefore possible to suppress an occurrence of an error due dust particles adhering to the surface of the optical disk. As a result, desirable recording/reproducing characteristics can be achieved.

In the foregoing structure, it is preferable that the protective layer be made up of ultraviolet ray curing resin.

According to this structure, it is possible to form the protective layer in the simple process at low costs.

For example, when laminating the plurality of disk sheets on the disk substrate, ultraviolet ray curing resin is applied onto the disk sheet in the simple manner, for example, by the spin coating method, and an ultraviolet ray is then projected to form the ultraviolet ray curing resin layer in a uniform thickness. In this way, it is possible to form the protective layer at low costs.

For the protectively layer, a transparent ultraviolet ray curing resin layer may be adopted, and by projecting the light beam from the side of the protective layer using the objective lens with a high NA, it is possible to record/reproduce information. As a result, the protective layer corresponding to the objective lens with high NA (0.8 or above, for example) can be formed.

In the foregoing structure, it is preferable that the protective layer be a protective sheet bonded to an upper most disk sheet.

According to this structure, it is possible to realize a still more uniform thickness of the protective layer.

Variations in thickness of the layer cause an increase in the coma aberration or the spherical aberration of the focused light beam projected from the side of the protective layer when recording or reproducing, and recording/reproducing characteristics are adversely affected. In response, by laminating the protective sheet in the uniform thickness to the upper most disk sheet, variations in thickness of the protective layer can be suppressed, and desirable recording/reproducing characteristics can be realized.

In the foregoing structure, it is preferable to arranged such that a recording face of the upper most disk sheet laminated at position most apart from the disk substrate is formed on the side of the disk substrate; and the upper most disk sheet is formed thicker than other disk sheet.

In this structure, the upper most disk sheet which is formed thicker than other disk sheet functions as the protective layer.

According to the foregoing structure, the recording face of the disk sheet or other disk sheet can be protected by the upper most disk sheet, and the recording face of the disk sheet can be prevented from being scratched by an impact from an external section.

When recording/reproducing by projecting the light beam from the side of the upper most disk sheet, the distance between the surface of the optical disk and the recording face (the recording face formed close to the disk surface, in particular) can be increased, and it is therefore possible to increase the ratio of the spot diameter on the surface of the optical disk with respect to the sport diameter of the recording face. With this structure, when carrying out the recording or reproducing operation, it is therefore possible to suppress an occurrence of an error due dust particles adhering to the surface of the optical disk. As a result, desirable recording/reproducing characteristics can be achieved.

It is needless to mention that each of the foregoing structures as described as the present invention may be combined with other structure according to the need.

As described, the optical disk of the present invention is arranged such that the inner diameter of the disk sheet layer is larger than the inner diameter of the disk substrate, the disk sheet layer can be prevented from being separated from the disk substrate or from the adjacent disk sheet layer at the central hole of the optical disk, and thus the effect of providing a highly reliable optical disk. Namely, in the case where the inner diameter of the disk sheet layer is equal to the inner diameter of the disk substrate, or the inner diameter of the disk sheet layer is smaller than the inner diameter of the disk substrate, when fixing and holding the optical disk, a jig contacts the central hole of the disk sheet layer, which causes a separation of the disk sheet. In contrast, in the case where the inner diameter of the disk sheet layer is larger than the inner diameter of the disk substrate, the jig contacts only the central hole of the disk substrate, and does not contact the central hole of the disk sheet layer, thereby suppressing the problem of the separation of the disk sheet.

According to the present invention wherein the outer diameter of the disk sheet layer is smaller than the outer diameter of the disk substrate, the disk sheet layer can be prevented from being separated from the disk substrate or from the adjacent disk sheet layer at an outer circumference of the optical disk, and thus the effect of providing a highly reliable optical disk can be achieved. Namely, in the case where the outer diameter of the disk sheet layer is equal to the outer diameter of the disk substrate or the outer diameter of the disk sheet layer is larger than the outer diameter of the disk substrate, when fixing and holding the optical disk, the disk sheet layer contacts a jig, which causes a separation of the disk sheet. In contrast, in the case where the outer diameter of the disk sheet layer is smaller than the outer diameter of the disk substrate, the jig contacts only the outer circumference of the disk substrate, and does not contact the outer circumference of the disk sheet layer, thereby suppressing the problem of the separation of the disk sheet.

According to the present invention wherein the plurality of disk sheets of the disk sheet layer are laminated in such a manner that the further from the disk substrate in a laminating direction, the larger is the inner diameter of the disk sheet. With this structure, the problem of the unspecified substances being caught at outer circumferential edges of the disk sheet layer, which in turn causes the problem of a separation of the disk sheet layer from the disk substrate, and from the adjacent disk sheet can be suppressed. As a result, a highly reliable optical disk can be realized.

According to the present invention wherein the plurality of disk sheets of the disk sheet layer are laminated in such a manner that the further from the disk substrate in a laminating direction, the smaller is the outer diameter of the disk sheet. With this structure, the problem of the unspecified substances being caught at outer circumferential edges of the disk sheet layer, which in turn causes the problem of a separation of the disk sheet layer from the disk substrate, and from the adjacent disk sheet can be suppressed. As a result, a highly reliable optical disk with an improved mechanical strength can be realized.

According to the present invention wherein the protective layer is provided so as to cover the ends in the radius direction of the disk sheet layer. With this structure, the foregoing problem of the unspecified substances being caught at outer circumferential edges of the disk sheet layer, which in turn causes the problem of a separation of the disk sheet layer from the disk substrate, and from the adjacent disk sheet can be more surely suppressed. As a result, a highly reliable optical disk can be realized. Namely, as the ends in the disk radius direction of the disk sheet layer is covered with the protective layer, even when unspecified substances hit the ends and caught by the protective layer, the separation of the disk sheet layer, etc., can be prevented.

According to the present invention wherein at least either the inner circumferential region and the outer circumferential region on the disk substrate is formed thicker than other region of the disk substrate, it is possible to increase the mechanical strength of the inner circumferential region, or the outer circumferential region or both the inner circumferential region and the outer circumferential region, thereby suppressing a damage of the disk substrate when being accidentally dropped or set in the recording/reproducing device. Namely, by forming the disk sheets in the above other region of the disk substrate, the disk sheet layer can be protected by at least one of the inner circumferential region and the outer circumferential region. As a result, the optical disk can be prevented from being scratched when accidentally dropped or installed in the recording/reproducing device.

As described, the optical disk in accordance with the present embodiment is characterized by including a plurality of disk sheets which are laminated, each of which has a recording face on one of the surfaces.

With this structure wherein a plurality of disk sheets, each having a recording face, are laminated, a shrinkage is not liable to occur in the process of forming recording faces, and thus the disk can be maintained flat.

As described, the method of manufacturing the optical disk of the present invention includes a recording face forming process of forming a recording face of the optical disk on a sheet material for use in forming a disk sheet of a sheet-like disk body, a laminating process of forming a laminated structure made up of a plurality of sheet materials, each having a recording face, and a process of cutting off the laminated structure of the plurality of disk sheets, each having a recording face.

According to the foregoing method, the recording face is formed on the sheet member by the recording face forming process, and further by laminating the plurality of sheet materials, each having a recording face formed thereon, multilayered recording faces can be realized. As a result, the improved flatness of the disk can be maintained without generating the problem of the shrinkage in the recording face forming process.

Furthermore, as a disk sheet of a uniform thickness without a partial distortion can be selected as a disk sheet to be laminated, an interval between recording faces of the adjacent disk sheets can be maintained constant.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. The An optical disk comprising:
   a disk substrate having a top surface;
   a disk sheet lamination on said disk substrate;
   wherein said disk sheet lamination is formed by a plurality of disk sheets, each of the disk sheets having a recording face on a front surface, and a back surface that is opposite to the front surface, said back surface is a planar surface;
   wherein the recording face on the front surface is arranged so as to include one of recessed pits or recessed tracks therein for tracking;

wherein said plurality of disk sheets are laminated in such a manner that between adjacent two disk sheets, the back surface of one of the disk sheets faces the front surface of the other disk sheet;

wherein between the disk substrate and the disk sheet and between adjacent disk sheets, an adhesive layer made up of ultraviolet ray curing resin, is formed; and wherein the front surface including the recording face of a given disk sheet that is located closest to the disk substrate, is directly adhered to the disk substrate top surface.

2. The optical disk as set forth in claim 1, wherein:

an adhesive layer is provided between the disk substrate and the disk sheet lamination and between adjacent disk sheets, the adhesive layer being made up of ultraviolet ray curing resin, the adhesive layer being for securing each adjacent two disk sheets to each other and to secure the disk sheet lamination to the disk substrate.

3. The optical disks as set forth in claim 1, wherein:

the disk sheet is formed thinner than the disk substrate.

* * * * *